United States Patent
Zhang

(10) Patent No.: US 12,149,754 B2
(45) Date of Patent: Nov. 19, 2024

(54) METHOD FOR SHARING CAMERA BY PLURALITY OF APPLICATIONS AND ELECTRONIC DEVICE

(71) Applicant: Huawei Technologies Co., Ltd., Shenzhen (CN)

(72) Inventor: Chuang Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 18/043,678

(22) PCT Filed: Aug. 24, 2021

(86) PCT No.: PCT/CN2021/114331
§ 371 (c)(1),
(2) Date: Mar. 1, 2023

(87) PCT Pub. No.: WO2022/048474
PCT Pub. Date: Mar. 10, 2022

(65) Prior Publication Data
US 2023/0379510 A1    Nov. 23, 2023

(30) Foreign Application Priority Data

Sep. 2, 2020    (CN) ........................ 202010911343.9

(51) Int. Cl.
| | |
|---|---|
| *H04N 21/218* | (2011.01) |
| *B60R 1/00* | (2022.01) |
| *H04N 5/262* | (2006.01) |
| *H04N 21/2187* | (2011.01) |

(Continued)

(52) U.S. Cl.
CPC ... *H04N 21/21805* (2013.01); *H04N 21/2187* (2013.01); *H04N 23/60* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 6,539,441 B1 * | 3/2003 | Dieckman | G06F 9/52 710/36 |
| 2010/0122165 A1 * | 5/2010 | Uberti | H04L 65/764 715/716 |
| 2010/0231754 A1 * | 9/2010 | Wang | H04N 5/76 348/231.99 |

FOREIGN PATENT DOCUMENTS

EP    3736667 A1 *  11/2020

* cited by examiner

*Primary Examiner* — Hung Q Dang
(74) *Attorney, Agent, or Firm* — Slater Matsil, LLP

(57) ABSTRACT

In an embodiment a method for sharing a camera includes separately performing, by an electronic device, in response to an image obtaining request sent by a first application and an image obtaining request sent by a second application, the following operations: creating a first image consumer instance corresponding to the first application and creating a second image consumer instance corresponding to the second application, obtaining a corresponding first image provider instance based on the first camera and the first image parameter set that are requested by the image obtaining requests sent by the first application and the second application and establishing an association between the first image consumer instance and the first image provider instance and an association between the second image consumer instance and the first image provider instance.

20 Claims, 16 Drawing Sheets

(51) Int. Cl.
*H04N 23/60* (2023.01)
*H04N 23/90* (2023.01)

CONT.
FROM

METHOD FOR SHARING CAMERA BY PLURALITY OF APPLICATIONS AND ELECTRONIC DEVICE

This application is a National Stage of International Application No. PCT/CN2021/114331, filed on Aug. 24, 2021, which claims priority to Chinese Patent Application No. 202010911343.9, filed on Sep. 2, 2020. Both of the aforementioned applications are hereby incorporated by reference in their entireties.

TECHNICAL FIELD

This application relates to the field of image processing technologies, and in particular, to a method for sharing a camera by a plurality of applications and an electronic device.

BACKGROUND

In an electronic device (for example, a mobile phone or a personal computer), there may be a plurality of applications (applications, APPs for short, also referred to as applications) that need to use a camera (camera). Currently, one camera can be currently used by only one application.

An Android system is used as an example. An Android architecture restricts that one camera can be currently used by only one application. If another application needs to use the camera, the system determines, based on permission of the two applications, ownership of a right to use the camera. For example, an application A is currently using a camera, and an application B also needs to use the camera. If permission of the application B is higher than that of the application A, the application B preempts a right to use the camera. Otherwise, the application B cannot preempt a right to use the camera.

Therefore, because one camera can be currently used by only one application, a plurality of applications cannot share the camera, resulting in poor user experience.

SUMMARY

An objective of this application is to provide a method for sharing a camera by a plurality of applications and an electronic device, so that the plurality of applications can share the camera.

The foregoing objective and other objectives are achieved by using features in the independent claims. Further implementations are embodied in the dependent claims, the specification, and the accompanying drawings.

According to a first aspect, a method for sharing a camera by a plurality of applications is provided. The method is applied to an electronic device, and includes:

separately in response to an image obtaining request sent by a first application and an image obtaining request sent by a second application, where the image obtaining request is used to request to obtain, from a first camera, image data that meets a requirement of a first image parameter set, performing the following operations: creating a first image consumer instance corresponding to the first application, creating a second image consumer instance corresponding to the second application, obtaining a corresponding first image provider instance based on the first camera and the first image parameter set that are requested by the image obtaining request sent by the first application and the second application, and establishing an association between the first image consumer instance and the first image provider instance, and an association between the second image consumer instance and the first image provider instance; and in response to receiving image data from the first camera, performing the following operations: The first image provider instance processes, based on the first image parameter set, the received image data collected by the first camera, and sends processed image data to the first image consumer instance and the second image consumer instance that are associated with the first image provider instance, the first image consumer instance sends the received image data to the first application, and the second image consumer instance sends the received image data to the second application.

In the foregoing embodiment, one application corresponds to one image consumer instance, one camera and one image parameter set correspond to one image provider instance, and one image provider instance may correspond to one or more image consumer instances. The foregoing "provider-consumer" mechanism may be used to share data of one camera with a plurality of applications for use. Therefore, by establishing respective data channels for a plurality of cameras, the electronic device can simultaneously control and obtain data collected by the one or more cameras. In this way, the plurality of applications at an electronic device side simultaneously obtain image data collected by the one or more cameras, so that the plurality of applications simultaneously use, at a same moment, image data that is obtained by the one or more cameras and that meets different image parameter requirements, to improve user experience. According to the foregoing embodiment, if a plurality of applications request a same target camera and require a same image parameter set, the plurality of applications may be associated with a same image provider instance, the image provider instance processes image data and separately sends processed image data to the plurality of applications. Therefore, an image processing operation for each application can be avoided, and overheads for image data processing can be reduced.

In some possible implementations, the method further includes: in response to an image obtaining request sent by a third application, where the image obtaining request is used to request to obtain, from the first camera, image data that meets a requirement of a second image parameter set, performing the following operations: creating a third image consumer instance corresponding to the third application; obtaining a corresponding second image provider instance based on the first camera and the second image parameter set that are requested by the image obtaining request sent by the third application; and establishing an association between the third image consumer instance and the second image provider instance; and in response to receiving image data from the first camera, further performing the following operations: The second image provider instance processes, based on the second image parameter set, the received image data collected by the first camera, and sends processed image data to the third image consumer instance associated with the second image provider instance; and the third image consumer instance sends the received image data to the third application.

According to the foregoing embodiment, if different applications request a same target camera but require different image parameter sets, the different applications need to be associated with different image provider instances, and the different image provider instances process image data based on image parameter sets corresponding to the different image provider instances, and send processed image data to corresponding applications, to meet different image parameter requirements of the different applications.

In some possible implementations, the method further includes: sending a control instruction to the first camera, where the control instruction carries an image parameter that is used to control the first camera to collect image data, and the image parameter matches an image parameter supported by the first camera, and is an image parameter that is in the first image parameter set and the second image parameter set and that meets a maximization requirement.

According to the foregoing embodiment, a plurality of applications may request to use a same target camera, but require different image parameter sets. In this case, image parameters of which common parts are maximized and that are in the image parameter sets may be obtained based on the image parameter sets of the plurality of applications that use the same target camera, and sent to the corresponding camera, to control the camera to collect data based on the image parameters. In one aspect, the maximized image parameter needs to match a capability of the target camera, and in another aspect, the maximized image parameter is an image parameter that meets a maximization requirement and that is in the image parameter sets of the plurality of applications that use the same target camera, so that image data collected by the camera may meet an image parameter requirement of a corresponding application directly or after image processing is performed.

In some possible implementations, the method further includes: in response to an image obtaining request sent by a fourth application, where the image obtaining request is used to request to obtain, from a second camera, image data that meets a third image parameter set, performing the following operations: creating a fourth image consumer instance corresponding to the fourth application; obtaining a corresponding third image provider instance based on the second camera and the third image parameter set that are requested by the image obtaining request sent by the fourth application, where the third image parameter set is the same as or different from the first image parameter set; and establishing an association between the fourth image consumer instance and the third image provider instance; and in response to receiving image data from the second camera, performing the following operations: The third image provider instance processes, based on the fourth image parameter set, the received image data collected by the second camera, and sends processed image data to the fourth image consumer instance associated with the third image provider instance; and the fourth image consumer instance sends the received image data to the fourth application.

According to the foregoing embodiment, if different applications request different target cameras and require different image parameter sets, the different applications need to be associated with different image provider instances. The different image provider instances obtain image data from corresponding cameras based on cameras and image parameter sets corresponding to the different applications, and process image data based on the corresponding image parameter sets, to meet a requirement that the different applications use the different cameras and require the different image parameters.

In some possible implementations, the image data collected by the first camera is separately sent to all image provider instances corresponding to the first camera.

According to the foregoing embodiment, all applications requesting a same camera can obtain image data collected by the camera, to implement sharing and use of a same camera by a plurality of applications.

In some possible implementations, that the first image provider instance processes, based on the first image parameter set, the received image data collected by the first camera includes at least one of the following operations:
  performing, based on an image format parameter in the first image parameter set, format conversion on the image data received from the first camera;
  performing, based on a color space parameter in the first image parameter set, color space conversion on the image data received from the first camera;
  performing, based on an image resolution in the first image parameter set, image resolution conversion on the image data received from the first camera;
  performing, based on a video frame rate in the first image parameter set, video frame rate conversion on the image data received from the first camera; or performing, based on image editing operation indication information in the first image parameter set, image editing on the image data received from the first camera, where the image editing operation indication information includes at least one of rotation indication information, mirroring indication information, and cropping indication information.

In the foregoing embodiment, the image provider instance may implement a plurality of image editing operations, and the image provider instance performs image editing, so that a developer can be prevented from modifying an application (that is, the application is modified to implement an image editing operation), and technical implementation is simple and easy.

In some possible implementations, the first camera is a built-in camera of the electronic device, or a camera of a communication apparatus connected to the electronic device; or the second camera is a built-in camera of the electronic device, or a camera of a communication apparatus connected to the electronic device.

According to the foregoing embodiment, a plurality of applications may share the built-in camera of the electronic device, and may alternatively share an external camera of the electronic device.

According to a second aspect, a method for sharing a camera by a plurality of applications is provided. The method is applied to an electronic device, and includes:
  in response to an image obtaining request sent by a first application, where the image obtaining request is used to request to obtain, from a first camera, image data that meets a requirement of a first image parameter set, performing the following operations:
  creating a first image consumer instance corresponding to the first application;
  obtaining a corresponding first image provider instance based on the first camera and the first image parameter set that are requested by the image obtaining request sent by the first application; and
  establishing an association between the first image consumer instance and the first image provider instance;
  in response to an image obtaining request sent by a second application, where the image obtaining request is used to request to obtain, from a second camera, image data that meets a requirement of a second image parameter set, and the second image parameter set is the same as or different from the first image parameter set, performing the following operations:

creating a second image consumer instance corresponding to the second application;

obtaining a corresponding second image provider instance based on the second camera and the first image parameter set that are requested by the image obtaining request sent by the second application; and establishing an association between the second image consumer instance and the second image provider instance; and in response to receiving image data from the first camera and the second camera, performing the following operations:

the first image provider instance processes, based on the first image parameter set, the received image data collected by the first camera, and sends processed image data to the first image consumer instance associated with the first image provider instance, and the first image consumer instance sends the received image data to the first application; and the second image provider instance processes, based on the second image parameter set, the received image data collected by the second camera, and sends processed image data to the second image consumer instance associated with the second image provider instance, and the second image consumer instance sends the received image data to the second application.

In the foregoing embodiment, one application corresponds to one image consumer instance, one camera and one image parameter set correspond to one image provider instance, and one image provider instance may correspond to one or more image consumer instances. The foregoing "provider-consumer" mechanism may be used to share data of one camera with a plurality of applications for use. Therefore, by establishing respective data channels for a plurality of cameras, the electronic device can simultaneously control and obtain data collected by the one or more cameras. In this way, the plurality of applications at an electronic device side simultaneously obtain image data collected by the one or more cameras, so that the plurality of applications simultaneously use, at a same moment, image data that is obtained by the one or more cameras and that meets different image parameter requirements, to improve user experience. According to the foregoing embodiment, if different applications request different target cameras and require different image parameter sets, the different applications need to be associated with different image provider instances. The different image provider instances obtain image data from corresponding cameras based on cameras and image parameter sets corresponding to the different applications, and process image data based on the corresponding image parameter sets, to meet a requirement that the different applications use the different cameras and require the different image parameters.

In some possible implementations, the method further includes:

in response to an image obtaining request sent by a third application, where the image obtaining request is used to request to obtain, from the first camera, image data that meets a requirement of a third image parameter set, and the third image parameter set is different from the first parameter set, performing the following operations:

creating a third image consumer instance corresponding to the third application;

obtaining a corresponding third image provider instance based on the first camera and the third image parameter set that are requested by the image obtaining request sent by the third application; and establishing an association between the third image consumer instance and the third image provider instance; and in response to receiving image data from the first camera, further performing the following operations:

the third image provider instance processes, based on the third image parameter set, the received image data collected by the first camera, and sends processed image data to the third image consumer instance associated with the third image provider instance; and the third image consumer instance sends the received image data to the third application.

In some possible implementations, the method further includes: sending a control instruction to the first camera, where the control instruction carries an image parameter that is used to control the first camera to collect image data, and the image parameter matches an image parameter supported by the first camera, and is an image parameter that is in the first image parameter set and the third image parameter set and that meets a maximization requirement.

In some possible implementations, the image data collected by the first camera is separately sent to all image provider instances corresponding to the first camera.

In some possible implementations, that the first image provider instance processes, based on the first image parameter set, the received image data collected by the first camera includes at least one of the following operations:

performing, based on an image format parameter in the first image parameter set, format conversion on the image data received from the first camera;

performing, based on a color space parameter in the first image parameter set, color space conversion on the image data received from the first camera;

performing, based on an image resolution in the first image parameter set, image resolution conversion on the image data received from the first camera;

performing, based on a video frame rate in the first image parameter set, video frame rate conversion on the image data received from the first camera; or performing, based on image editing operation indication information in the first image parameter set, image editing on the image data received from the first camera, where the image editing operation indication information includes at least one of rotation indication information, mirroring indication information, and cropping indication information.

In some possible implementations, the first camera is a built-in camera of the electronic device, and the second camera is another built-in camera of the electronic device. Alternatively, the first camera is a built-in camera of the electronic device, and the second camera is a camera of a communication apparatus connected to the electronic device. Alternatively, the first camera is a camera of a communication apparatus connected to the electronic device, and the second camera is a built-in camera of the electronic device. Alternatively, the first camera is a camera of a communication apparatus connected to the electronic device, and the second camera is a camera of another communication apparatus connected to the electronic device.

According to a third aspect, an electronic device is provided. The electronic device includes one or more processors and one or more memories. The one or more memories store one or more computer programs, the one or more computer programs include instructions, and when the instructions are executed by the one or more processors, the electronic device is enabled to perform the technical solution according to any one of the first aspect and the possible designs of the first aspect.

According to a fourth aspect, an electronic device is provided. The electronic device includes one or more processors and one or more memories. The one or more memories store one or more computer programs, the one or more computer programs include instructions, and when the instructions are executed by the one or more processors, the electronic device is enabled to perform the technical solution according to any one of the second aspect and the possible designs of the second aspect.

According to a fifth aspect, a computer-readable storage medium is provided. The computer-readable storage medium includes a computer program, and when the computer program is run on an electronic device, the electronic device is enabled to perform the technical solution according to any one of the first aspect and the possible designs of the first aspect.

According to a sixth aspect, a computer-readable storage medium is provided. The computer-readable storage medium includes a computer program, and when the computer program is run on an electronic device, the electronic device is enabled to perform the technical solution according to any one of the second aspect and the possible designs of the second aspect.

According to a seventh aspect, a chip is further provided. The chip is coupled to a memory in an electronic device, and performs the technical solution according to any one of the first aspect and the possible designs of the first aspect in embodiments of this application, or performs the technical solution according to any one of the second aspect and the possible designs of the second aspect in embodiments of this application. In embodiments of this application, "coupled" means that two components are directly or indirectly combined with each other.

According to an eighth aspect, a program product is further provided. The program product includes instructions. When the instructions are run on a computer, the computer is enabled to perform the technical solution according to any one of the first aspect and the possible designs of the first aspect. Alternatively, when the instructions are run on a computer, the computer is enabled to perform the technical solution according to any one of the second aspect and the possible designs of the second aspect.

According to a ninth aspect, a graphical user interface on an electronic device is further provided. The electronic device includes one or more memories and one or more processors, and the one or more processors are configured to execute one or more computer programs stored in the one or more memories. The graphical user interface includes a graphical user interface displayed when the electronic device performs the technical solution according to any one of the first aspect and the possible designs of the first aspect. Alternatively, the graphical user interface includes a graphical user interface displayed when the electronic device performs the technical solution according to any one of the second aspect and the possible designs of the second aspect.

For beneficial effects of the third aspect to the ninth aspect, refer to the beneficial effects of the first aspect. Details are not described again.

BRIEF DESCRIPTION OF THE DRAWINGS

FIG. 7b-1 and FIG. 7b-2 are a schematic diagram of a second phase of a process for sharing a camera by a plurality of applications according to an embodiment of this application;

FIG. 8a, and FIG. 8b-1 and FIG. 8b-2 are respectively schematic diagrams of relationships between an application, an image consumer instance, an image provider instance, and a camera in a vehicle driving scenario according to an embodiment of this application;

DETAILED DESCRIPTION OF ILLUSTRATIVE EMBODIMENTS

The following describes in detail technical solutions in embodiments of this application with reference to the accompanying drawings in the following embodiments of this application.

First, some technical terms in embodiments of this application are briefly described.

Instance: in the field of computer technologies, an instance is obtained by instantiating an object or a class. A class is a reflection of an entity in the real world or the thinking world in a computer, and encapsulates data and operations on the data. An object is a variable with a class type. The class and the object are most basic concepts in object-oriented programming technologies. The object or the class cannot be directly used after being defined, and can be used only after being instantiated. An instance can be obtained by instantiating an object or a class, to implement a function. An object or a class may be instantiated into a plurality of instances, and different instances run independently of each other.

A method for sharing a camera by a plurality of applications provided in embodiments of this application may be applied to an electronic device such as a mobile phone, a tablet computer, a wearable device (for example, a watch, a band, a helmet, a headset, or a necklace), a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
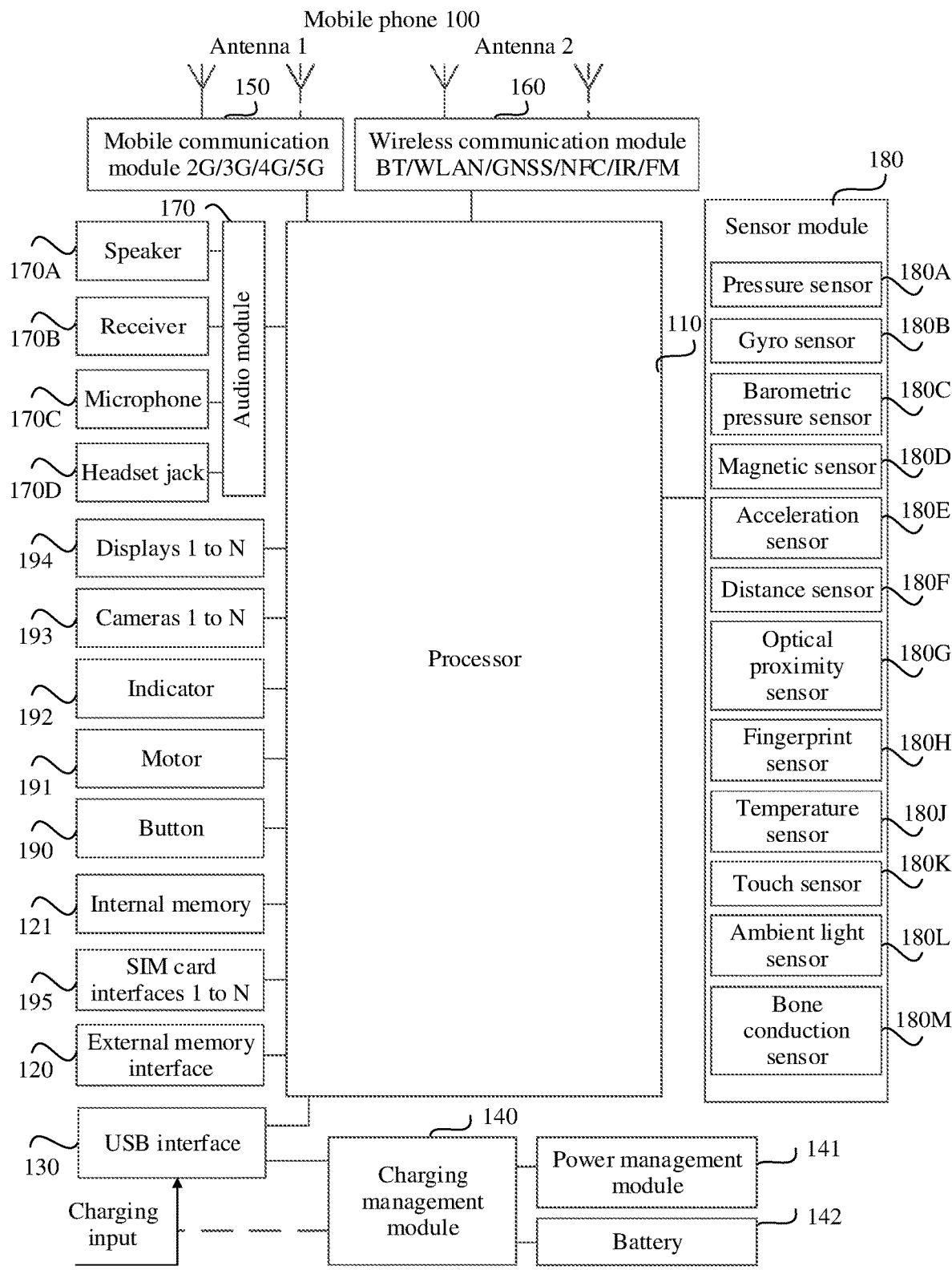
FIG. 1 is a schematic diagram of a hardware structure of an electronic device according to an embodiment of this application.

For example, FIG. 1 is a schematic diagram of a structure of an electronic device 100. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the electronic device 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

The USB interface 130 is an interface that conforms to a USB standard specification, and may be specifically a mini USB interface, a micro USB interface, a USB t e-C interface, or the like. The USB interface 130 may be configured to connect to a charger to charge the electronic device 100, or may be configured to transmit data between the electronic device 100 and a peripheral device. The charging management module 140 is configured to receive a charging input from a charger. The power management module 141 is configured to connect the battery 142 and the charging management module 140 to the processor 110. The power management module 141 receives an input from the battery 142 and/or the charging management module 140, to supply power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module iso, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that includes wireless communication such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules in the processor 110.

The wireless communication module 160 may provide a solution that is applied to the electronic device 100 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, for example, a viewfinder interface of a camera application. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the light-sensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, software code of at least one application, and the like. The data storage area may store data (for example, a shot image or a recorded video) or the like generated when the electronic device 100 is used. In addition, the internal memory 121 may include a high-speed random access memory, or may include a non-volatile memory such as at least one magnetic disk storage device, a flash memory device, or a universal flash storage (universal flash storage, UFS).

The external memory interface 120 may be configured to connect to an external storage card, for example, a micro SD card, to extend a storage capability of the electronic device. The external storage card communicates with the processor 110 through the external memory interface 120, to implement a data storage function. For example, a file such as a picture or a video is stored in the external storage card.

The electronic device 100 may implement an audio function, for example, music playing and recording, by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. The gyro sensor 180B may be configured to determine a moving posture of the electronic device 100. In some embodiments, an angular velocity of the electronic device 100 around three axes (namely, axes x, y, and z) may be determined through the gyro sensor 180B.

The gyro sensor 180B may be configured to implement image stabilization during photographing. The barometric pressure sensor 180C is configured to measure barometric pressure. In some embodiments, the electronic device 100 calculates an altitude based on a barometric pressure value measured by the barometric pressure sensor 180C, to assist in positioning and navigation. The magnetic sensor 180D includes a Hall sensor. The electronic device 100 may detect opening and closing of a flip cover or a smart cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the smart cover or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to recognize a posture of the electronic device 100, and is applied to applications such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F to implement quick focusing. The optical proximity sensor 180G may include, for example, a light-emitting diode (LED), and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100.

It can be understood that the components shown in FIG. 1 do not constitute a specific limitation on the electronic device 100. A mobile phone may further include more or fewer components than those shown in the figure, or combine some components, or split some components, or have different component arrangements. In addition, a combination/connection relationship between the components in FIG. 1 may also be adjusted and modified.

Figure 2:
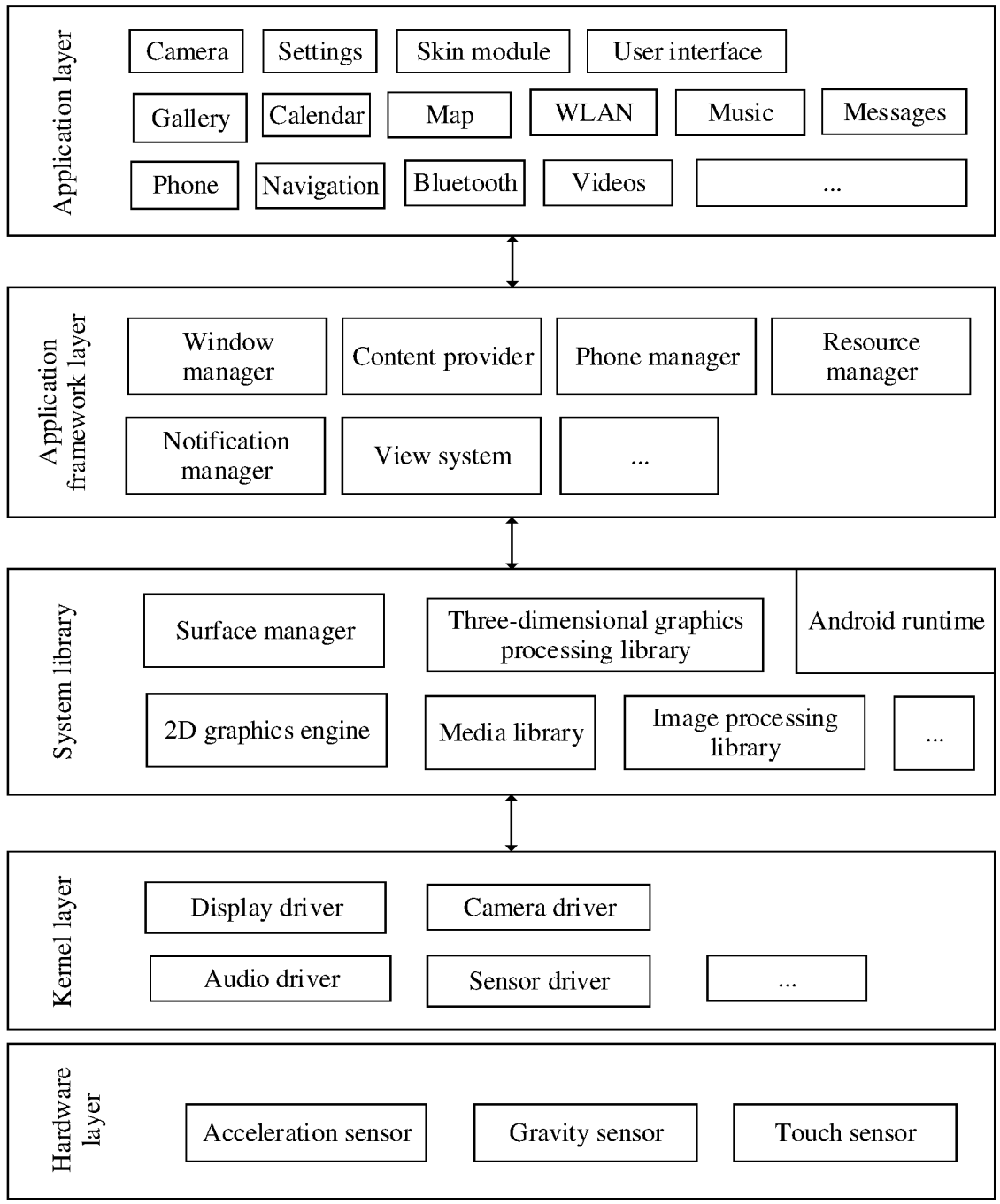
FIG. 2 is a schematic diagram of a software structure of an electronic device according to an embodiment of this application.

FIG. 2 is a block diagram of a software structure of an electronic device according to an embodiment of this application. As shown in FIG. 2, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 2, the application layer may include Camera, Settings, a skin module, a user interface (user interface, UI), a third-party application, and the like. The third-party application may include Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer may include some predefined functions. As shown in FIG. 2, the application framework layer may include a window manager, a content provider, a view system, a phone manager, a resource manager, a notification manager, and the like.

The window manager is used to manage a window program. The window manager may obtain a size of a display, determine whether there is a status bar, perform screen locking, take a screenshot, and the like. The content provider is used to store and obtain data, and enable the data to be accessed by an application. The data may include a video, an image, audio, calls that are made and answered, a browsing history, a bookmark, a phone book, and the like.

The view system includes visual controls such as a control for displaying a text and a control for displaying an image. The view system may be used to construct an application. A display interface may include one or more views. For example, a display interface including an SMS message notification icon may include a text display view and an image display view.

The phone manager is used to provide a communication function of the electronic device, for example, management of a call status (including answering, declining, or the like).

The resource manager provides various resources such as a localized character string, an icon, an image, a layout file, and a video file for an application.

The notification manager enables an application to display notification information in a status bar, and may be used to convey a notification message. The notification manager may automatically disappear after a short pause without requiring a user interaction. For example, the notification manager is used to notify download completion, give a message notification, and the like. The notification manager may alternatively be a notification that appears in a top status bar of the system in a form of a graph or a scroll bar text, for example, a notification of an application that is run in a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android. The application layer and the application framework layer run on the virtual machine. The virtual machine executes java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), a media library (media library), a three-dimensional graphics processing library (for example, an OpenGL ES), and a 2D graphics engine (for example, an SGL).

The surface manager is used to manage a display subsystem and provide fusion of 2D and 3D layers for a plurality of applications.

The media library supports playback and recording in a plurality of frequently used audio and video formats, a static image file, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3:
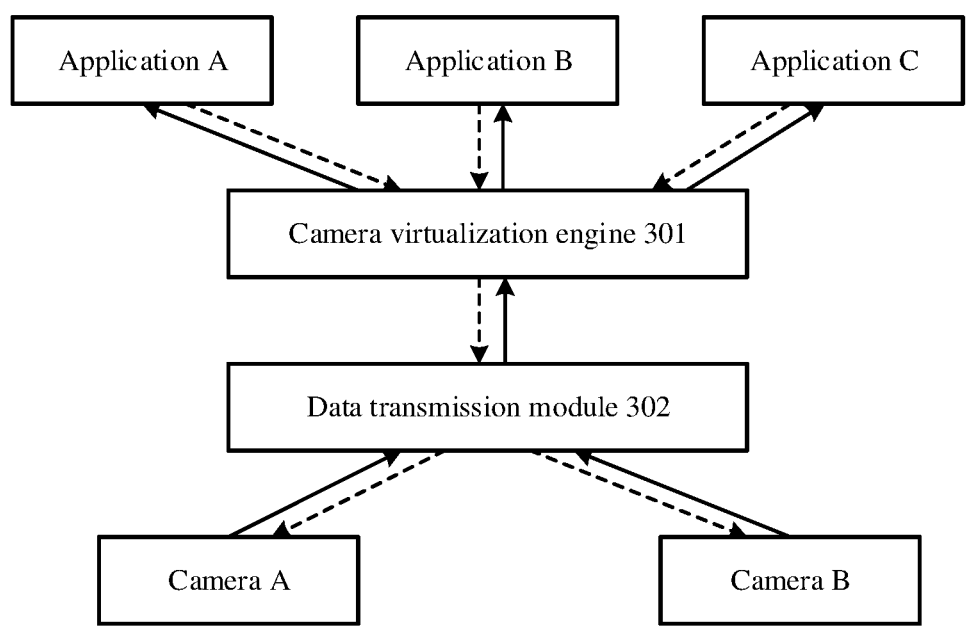
FIG. 3 is a schematic diagram of an architecture for sharing a camera by a plurality of applications according to an embodiment of this application.

FIG. 3 is an example of a schematic diagram of an architecture for sharing a camera by a plurality of applications according to an embodiment of this application.

As shown in FIG. 3, in this embodiment of this application, an application A, an application B, and an application C are all applications that can use a camera. The application A, the application B, and the application C are connected to a camera virtualization engine 301, the camera virtualization engine 301 is connected to a data transmission module 302, and the data transmission module 302 is connected to a camera A and a camera B.

The data transmission module 302 may be directly connected to the camera A and the camera B, or may be connected to the camera A and the camera B by using a camera adaptation module. For example, when the camera A and the camera B are external cameras of an electronic device, the data transmission module 302 is connected to adaptation modules of the camera A and the camera B, and the adaptation modules may control the camera A and the camera B.

It should be noted that FIG. 3 is described merely by using an example in which three applications share two cameras. In actual application, a quantity of applications and a quantity of cameras are not limited by FIG. 3. For example, the quantity of the applications may be two or more than the quantity of the applications shown in FIG. 3, and the quantity of the cameras may be one or more than the quantity of the cameras shown in FIG. 3.

In some possible implementations, the application A, the application B, the application C, the camera virtualization engine 301, and the data transmission module 302 are disposed in an electronic device, and the camera A and the camera B are independent of the electronic device, for example, located in another apparatus. A camera adaptation module may be disposed in the apparatus, to control the camera to obtain an image in a specified format, and may communicate with the data transmission module in the electronic device, to receive an image obtaining instruction and return image/video data obtained from the camera. The camera adaptation module may be implemented by a software development kit (software development kit, SDK) of a camera.

Figure 4A:
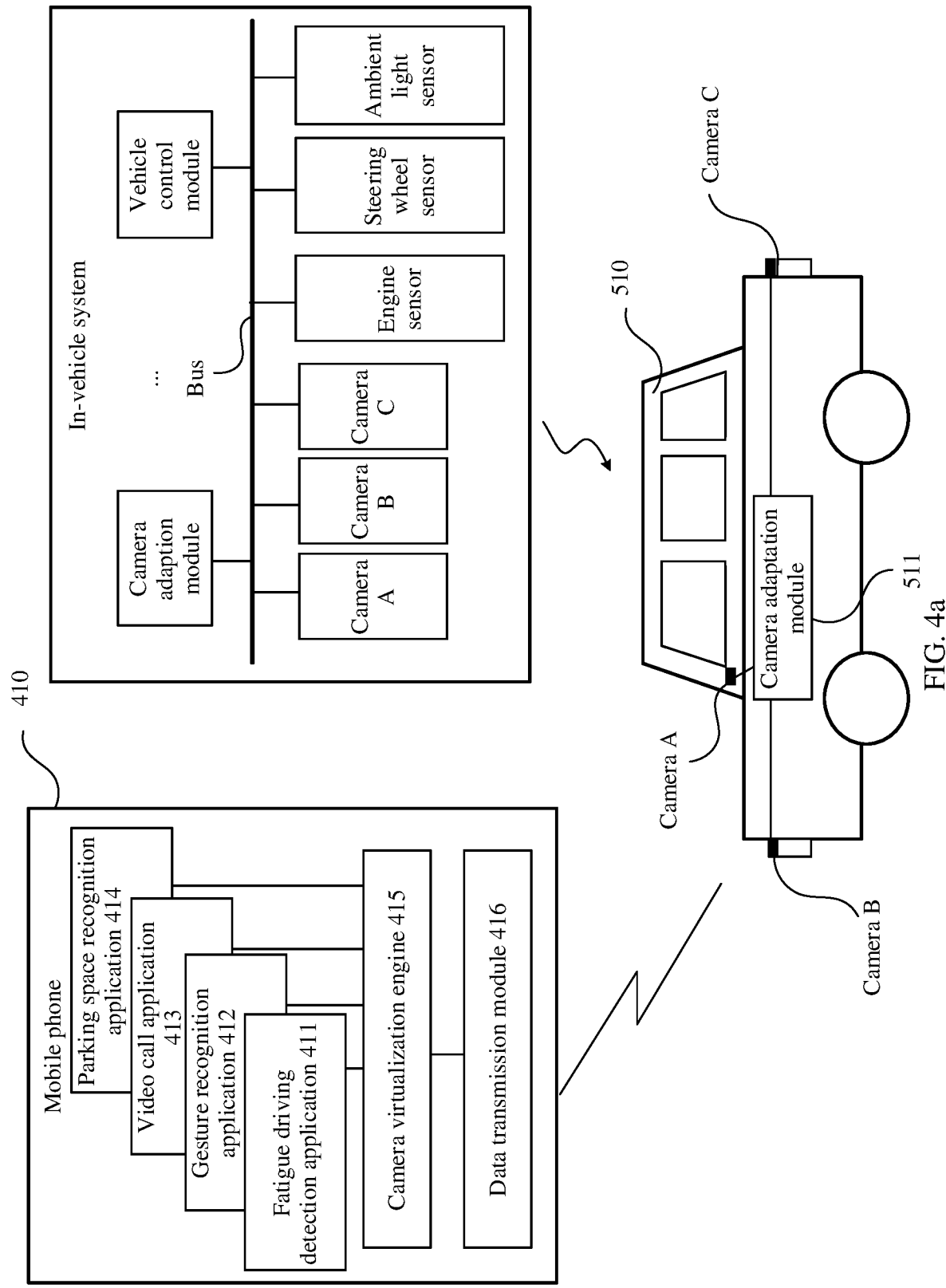
FIG. 4a is a schematic diagram of a vehicle driving scenario according to an embodiment of this application.

For example, FIG. 4a shows a vehicle driving scenario. A fatigue driving detection application 411, a gesture recognition application 412, a video call application 413, and a parking space recognition application 414 are installed in a mobile phone 410. A camera A that can collect an image of a driver is disposed on a dashboard of a vehicle 510. A front-facing camera B that can collect a front-facing exterior image of the vehicle is disposed on the front of the vehicle. A camera C that can collect a rear-facing exterior image of the vehicle is disposed on the tail of the vehicle. The camera A, the camera B, and the camera C are all connected to a camera adaptation module 511 in an in-vehicle system, and working states of the camera A, the camera B, and the camera C may be controlled by the camera adaptation module 511. A camera virtualization engine 415 and a data transmission module 416 are further disposed in the mobile phone 410. The camera virtualization engine 415 is equivalent to the camera virtualization engine 301 in FIG. 3, and the data transmission module 416 is equivalent to the data transmission module 302 in FIG. 3. The data transmission module 416 may communicate with the in-vehicle system, for example, may send a request for a camera to the in-vehicle system, so that the in-vehicle system controls the camera. The data transmission module 416 may further receive, from the in-vehicle system, image or video data collected by the camera.

As shown in FIG. 4a, the in-vehicle system forms an in-vehicle integrated information processing system based on a vehicle body bus system and an internet service by using a dedicated in-vehicle central processing unit. The in-vehicle system may implement a series of applications, including three-dimensional navigation, live traffic, network protocol television (internet protocol television, IPTV), assisted driving, fault detection, vehicle information, vehicle body control, mobile office, wireless communication, an online entertainment function, and a vehicle remote service provider (telematics service provider, TSP) service. FIG. 4a shows an example of a partial structure of the in-vehicle system. In a part related to this embodiment of this application, the cameras (for example, the camera A, the camera B, and the camera C) disposed in various parts of the vehicle are connected to the camera adaptation module 511 in the in-vehicle system through a bus. The camera adaptation module 511 may send, based on the bus, a control instruction to a corresponding camera, or may receive image or video data collected and sent by the corresponding camera. The camera adaptation module 511 may be a function module in a central processing unit, and the function module may be implemented by an SDK of a camera. In addition, various components such as sensors disposed in the vehicle are also connected to a corresponding control module (for example, a vehicle control module in the figure) through the bus, to exchange information and data, so as to implement a corresponding control function.

In some other possible implementations, the application A, the application B, the application C, the camera virtualization engine 301, the data transmission module 302, the camera A and the camera B are disposed in an electronic device, that is, the camera A and the camera B are built-in cameras of the electronic device.

Figure 4B:
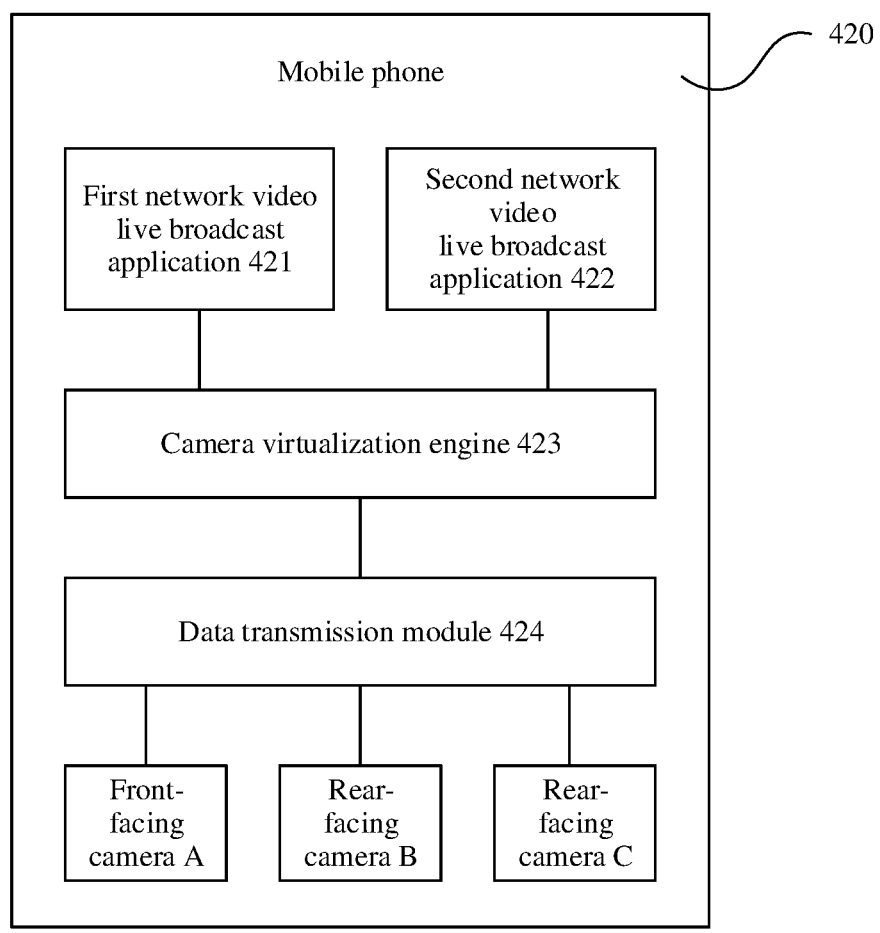
FIG. 4b is a schematic diagram of a scenario in which a mobile phone performs network video live broadcasting according to an embodiment of this application.

For example, FIG. 4b shows a scenario in which a mobile phone performs network video live broadcasting. A first network video live broadcast application 421 and a second network video live broadcast application 422 are installed in a mobile phone 420, and a camera virtualization engine 423 and a data transmission module 424 are disposed. A front-facing camera A and two rear-facing cameras (for example, a camera B and a camera C) are disposed in the mobile phone 420 in a built-in manner. Certainly, quantities of the front-facing camera and the rear-facing camera may be in other cases, and are not limited by the quantity shown in FIG. 4b. For example, a plurality of front-facing cameras and a plurality of rear-facing cameras may also be disposed in the mobile phone 420 in a built-in manner. The camera virtualization engine 423 is equivalent to the camera virtualization engine 301 in FIG. 3, and the data transmission module 424 is equivalent to the data transmission module 302 in FIG. 3.

Based on the architecture shown in FIG. 3, in some other possible implementations, the application A, the application B, the application C, the camera virtualization engine 301, the data transmission module 302, and the camera A are disposed in an electronic device, and the camera B is independent of the electronic device, for example, disposed in another apparatus.

The "connection" refers to a communication connection, and two modules, units, components, or the like that are in a communication connection may exchange information, specifically including signaling and/or data exchange. In FIG. 3, a dashed line represents signaling transmission, and a solid line represents data transmission.

Based on the architecture shown in FIG. 3, for example, the application A may send an image obtaining request to the camera virtualization engine 301 to request to obtain an image or a video collected by the camera A. The camera virtualization engine 301 may send, to the data transmission module 302 based on the image obtaining request sent by the application A, a request for controlling the camera A. The data transmission module 302 may send a control instruction to the camera A based on the request for controlling the camera A, to enable the camera A. After collecting image or video data, the camera A may send the data to the data transmission module 302. The data transmission module 302 may send the data to the camera virtualization engine 301. The camera virtualization engine 301 may send the data to the application A.

The image obtaining request sent by the application A may be used to request a single-frame image collected by the camera, which is equivalent to enabling the camera to operate in a camera mode to shoot a single-frame image, or may be used to request to obtain a video collected by the camera, which is equivalent to enabling the camera to operate in a camera mode to collect a video. Because a video includes a series of consecutive images, in this embodiment of this application, the requests used to obtain the single-frame image and obtain the video are collectively referred to as the image obtaining request.

Different applications may request to use different cameras, and each camera corresponds to one data channel. Therefore, there may be a plurality of data channels between the electronic device and a plurality of cameras at the same time.

Based on the architecture shown in FIG. 3, in some embodiments, an image obtaining request sent by an application may carry an image parameter set required by the application. After receiving the image/video data collected by the camera and sent by the data transmission module 302, the camera virtualization engine 301 may perform processing (for example, image format conversion and color space conversion) based on an image parameter required by an application, and send processed data to the corresponding application. If a plurality of applications require a same image parameter, the camera virtualization engine 301 may perform an image processing operation only once for these applications, to obtain image/video data that meets requirements of these applications, and separately send the image/video data to these applications, to avoid repeated operations caused by separately performing data processing for each application, and avoid waste of resource overheads.

Different applications may have different requirements on a size, display quality, and the like of an image or a video, and the size, the display quality, and the like may be specifically represented by using one or more image parameters. An image parameter set required by an application may include at least one of the following image parameters.

(1) A data format parameter that is used to indicate a data format. For an image, the parameter indicates an image format, for example, the image format may include bmp, jpg, png, tif, gif, pcx, tga, exif, fpx, svg, psd, cdr, pcd, dxf, ufo, eps, ai, raw, WMF, webp, and the like. For a video, the parameter indicates a video format, for example, the video format may include MPEG, AVI, nAVI, ASF, MOV, 3GP, WMV, DivX, XviD, RM, RMVB, FLV/F4V, and the like.

(2) Resolution. For example, the resolution may include 480p, 720p, and 1080p.

(3) Frame rate. For example, the frame rate may be 30 fps or 60 fps.

(4) A color space parameter that is used to indicate a used color space. For example, the color space may include RGB, CMYK, Lab, NV21, and the like.

It should be noted that the foregoing types of image parameters are merely examples, and types of the image parameters are not limited in this embodiment of this application. In actual application, more types of image parameters may be included.

The camera virtualization engine 301 may summarize image parameter sets of a plurality of applications to obtain an image parameter that is used to control a camera to collect data, so that the camera collects image/video data based on the image parameter. A plurality of applications may request to use a same target camera, but require different image parameter sets. The camera virtualization engine 301 may obtain, based on the image parameter sets of the plurality of applications that use the same target camera, image parameters of which common parts are maximized and that are in the image parameter sets, and send the image parameters to the corresponding camera by using the data transmission module 302, to control the camera to collect data based on the image parameters. In one aspect, the maximized image parameter needs to match a capability of the target camera, and in another aspect, the maximized image parameter is an image parameter that meets a maximization requirement and that is in the image parameter sets of the plurality of applications that use the same target camera.

To enable the maximized image parameter to match the capability of the target camera, a matched image parameter or a closest image parameter may be selected from image parameters supported by the target camera and is used as an image collection configuration parameter of the target camera.

To meet requirements of a plurality of applications, a parameter having a high image requirement may be selected as the image collection configuration parameter of the target camera. After receiving image/video data collected by the target camera, the camera virtualization engine 301 may perform processing such as format conversion and/or color space conversion, so that processed image/video data meets an application having a relatively low image requirement.

For example, the application A and the application B request to use a same target camera, an image resolution required by the application A is 480p, an image resolution required by the application B is 720p, and a maximum resolution supported by the target camera is 1080p. The camera virtualization engine 301 selects, based on the foregoing case, the resolution 720p as a resolution based on which the target camera collects data (that is, a resolution of an image collected by the camera is 720p). The resolution 720p selected by the camera virtualization engine 301 is adaptive to the capability of the target camera, and meets a requirement of the application B. A requirement of the application A may also be met after the resolution is reduced to 480p.

For another example, the application A and the application B request to use a same target camera, an image format required by the application A is jpg, an image format required by the application B is raw (raw is an uncompressed format, and jpg is a lossy compression format), and image formats supported by the target camera include jpg and raw. The camera virtualization engine 301 selects, based on the foregoing case, the image format raw as an image format based on which the target camera collects data (that is, image data collected by the camera is stored in a raw format). The image format raw selected by the camera virtualization engine 301 is adaptive to the capability of the target camera, and meets a requirement of the application B. A requirement of the application A may also be met by converting an image in a raw format into an image in a jpg format.

After the foregoing processing, the plurality of APPs inside the mobile phone may simultaneously obtain images of an internal camera or an external camera of the mobile phone, and do not affect each other.

Further, in this embodiment of this application, the image parameter set may further include one or more pieces of editing operation indication information, and one piece of editing operation indication information is used to indicate an editing operation. For example, the editing operation indication information may include at least one of the following:

rotation indication information, used to indicate an editing operation of rotating an image/a video;

mirroring indication information, used to indicate an editing operation of mirroring an image/a video; and cropping indication information, used to indicate an editing operation of cropping an image/a video, and the like.

It should be noted that the editing operation type indicated by the foregoing editing operation indication information is merely an example. A type of an image editing operation is not limited in this embodiment of this application. In actual application, more types of image editing operations may be included.

Further, if the image parameter set includes the rotation indication information, the image parameter set may further include rotation angle indication information. Alternatively, if the image parameter set includes the cropping indication information, the image parameter set may further include a cropping manner or cropping policy information, to indicate a cropping location, a cropping size, and/or the like.

In the foregoing embodiment, because an editing operation on an image is implemented by an image provider instance, image processing operation load of an application and development workload of the application are not increased.

In this embodiment of this application, two levels of instances may be introduced between an application and a camera: an image consumer instance (ImageConsumer) and an image provider instance (ImageProvider). The image provider instance is mainly configured to receive data (which includes image data and/or video data) collected by the camera, process the received data, and send processed data to the image consumer instance. The image consumer instance is mainly configured to consume the data collected by the camera, that is, send the data collected by the camera to an application corresponding to the image consumer instance.

Creation and management of the image consumer instance and the image provider instance may be implemented by the camera virtualization engine 301.

Figure 5:
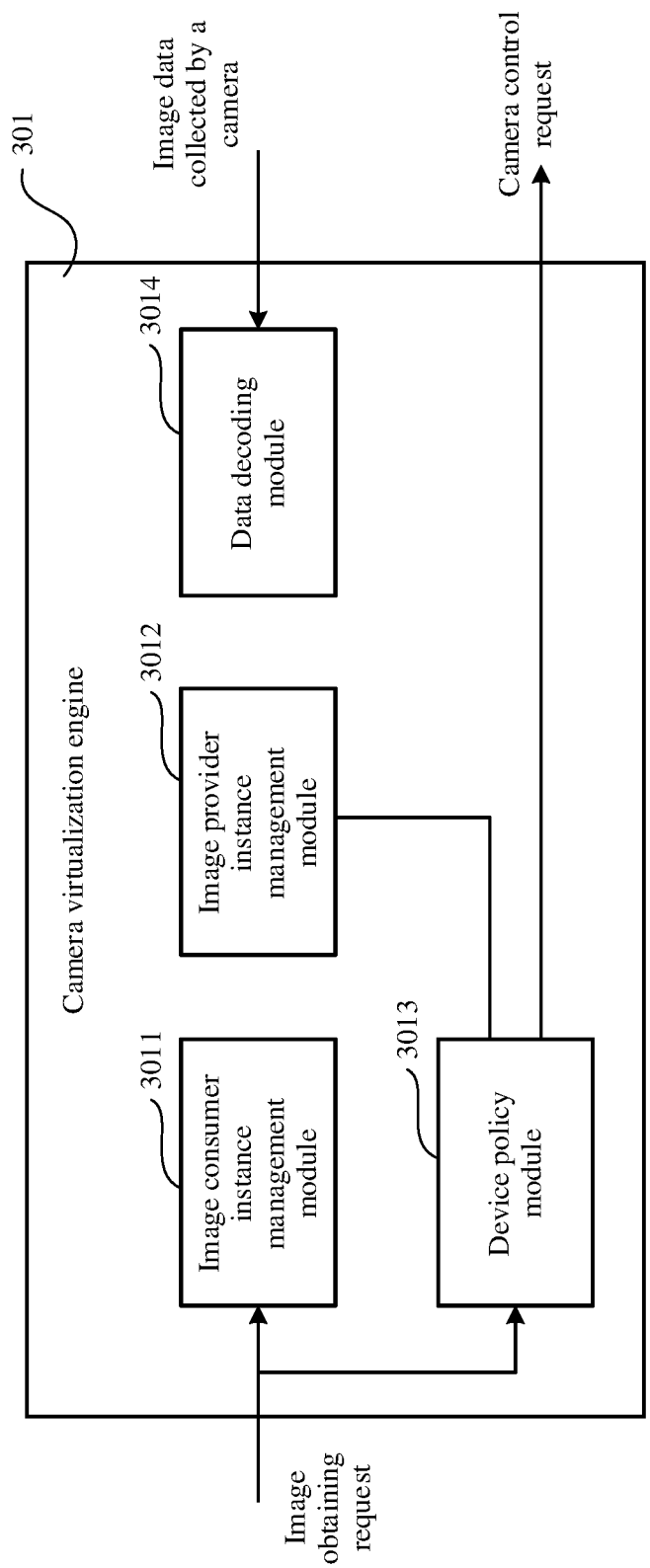
FIG. 5 is a schematic diagram of a structure of a camera virtualization engine according to an embodiment of this application.

FIG. 5 shows an example of a schematic diagram of a structure of the camera virtualization engine 301.

As shown in FIG. 5, the camera virtualization engine 301 may include an image consumer instance management module 3011, an image provider instance management module 3012, and a device policy module 3013, and may further include a data decoding module 3014. The image consumer instance management module 3011 is configured to create and manage an image consumer instance. The image provider instance management module is configured to create and manage an image provider instance. The device policy module 3013 is configured to determine whether a new image provider instance needs to be created, and send a control instruction such as an enabling instruction to a target camera by using the data transmission module 302. The data decoding module 3014 is configured to decode image/video data transmitted from the data transmission module 302.

A process of creating an image consumer instance and an image provider instance may include: When an application requests to use a camera (that is, requests to obtain data collected by the camera), the device policy module determines, based on the request, whether a new image provider instance needs to be created; and if the new image provider instance needs to be created, the image provider instance management module 3012 is triggered to create the image provider instance, and the image consumer instance management module 3011 may create, based on the request, the image consumer instance corresponding to the application, and establishes an association between the image consumer instance and the corresponding image provider instance. The image consumer instance is in a one-to-one correspondence with the application, and the image provider instance corresponds to the camera requested by the application and an image parameter set required by the application.

An implementation of establishing the association between the image consumer instance and the image provider instance may be: establishing a mapping relationship table between the image consumer instance and the image provider instance, where the mapping relationship table includes identification information of the image consumer instance and identification information of an image provider instance that has an association relationship with the image consumer instance, and one image provider instance may correspond to one image consumer instance list. Certainly, another method may be used to establish the association between the image consumer instance and the image provider instance. This is not limited in this embodiment of this application.

In some cases, after an application sends an image obtaining request, if the device policy module 3013 determines, based on a target camera and an image parameter set that are requested by the request, that an image provider instance corresponding to the target camera and the image parameter set already exists, a new image provider instance does not need to be created, but the image provider instance corresponding to the target camera and the image parameter set is associated with a created image consumer instance. For example, in the mapping relationship table between the image consumer instance and the image provider instance, identification information of an image consumer instance corresponding to the application is added to an image consumer instance list corresponding to the image provider instance corresponding to the target camera and the image parameter set.

In some embodiments, when an application requests to stop using a camera or the application is closed, the image consumer instance management module 3011 may delete an image consumer instance corresponding to the application. Further, if determining that an image provider instance associated with the image consumer instance is no longer associated with any image consumer instance after the image consumer instance is deleted, the device policy module 3013 may indicate the image provider instance management module 3012 to delete the image provider instance. Storage resources may be released by deleting the image consumer instance and/or the image provider instance.

The data decoding module 3014 is mainly configured to decode the data collected by the camera. Specifically, the data decoding module 3014 receives original image/video data (for example, data in H264, H265, or another format) collected by the camera and sent by a data transmission module, and decodes the data into image frame data (for example, data in a YUV or RGB color space) that can be used for image processing, so that the image provider instance performs further image processing.

In some embodiments, the device policy module 3013 may obtain, based on image parameter sets of a plurality of applications that use a same target camera, image parameters of which common parts are maximized and that are in the image parameter sets, and send the image parameters to the corresponding camera by using the data transmission module 302, to control the camera to collect data based on the image parameters. For a specific implementation method, refer to the foregoing content.

Figure 6:
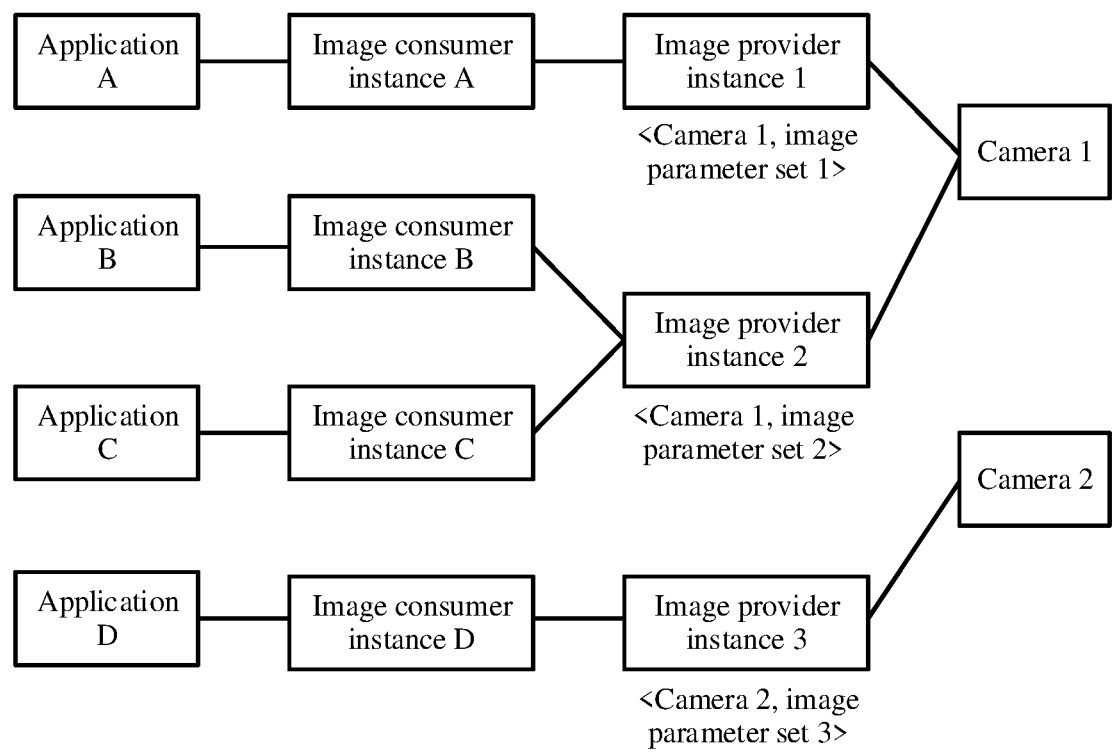
FIG. 6 is a schematic diagram of a relationship between an application, an image consumer instance, an image provider instance, and a camera according to an embodiment of this application.

FIG. 6 shows an example of a schematic diagram of a relationship between an application, an image consumer instance, an image provider instance, and a camera.

As shown in the figure, one image consumer instance is in a one-to-one correspondence with one application, one image provider instance may be associated with one or more image consumer instances, one image provider instance corresponds to only one camera, and different image provider instances may correspond to a same camera.

Each image provider instance corresponds to a combination of an image parameter set and an identifier of a camera, and combinations of image parameter sets and identifiers of cameras corresponding to different image provider instances are different from each other.

FIG. 6 is used as an example. An application A, an application B, and an application C request to use a camera 1, and an application D requests to use a camera 2. An image parameter set required by the application A is an image parameter set 1, an image parameter set required by the application B and the application C is an image parameter set 2, and an image parameter set required by the application D is an image parameter set 3. In this case, the relationship between the application, the image consumer instance, the image provider instance, and the camera is as follows.

The application A corresponds to an image consumer instance A, the application B corresponds to an image consumer instance B, the application C corresponds to an image consumer instance C, and the application D corresponds to an image consumer instance D. An image provider instance 1 corresponds to the camera 1 and the image parameter set 1, and is associated with the image consumer instance A. An image provider instance 2 corresponds to the camera 1 and the image parameter set 2, and is associated with the image consumer instance B and the image consumer instance C. An image provider instance 3 corresponds to the camera 2 and the image parameter set 3, and is associated with the image consumer instance D.

Further, it may be learned from FIG. 6 that, if a plurality of applications use a same camera and use a same image parameter set, image consumer instances corresponding to these applications may be associated with a same image consumer instance, so that editing processing may be performed on data collected by the camera based on the image consumer instance, to obtain data that meets requirements of these applications, and the data is separately sent to these applications, to avoid repeated data editing processing operations for each application, and reduce overheads for data processing.

An application may add an image parameter set to an image obtaining request, so that an image provider instance corresponding to the application can obtain the image parameter set. In one aspect, the image provider instance may add all or some parameters in the image parameter set to a request for controlling a camera, and send the request to the camera by using a data transmission module, so that the camera collects data based on the image parameter. In another aspect, after receiving the data collected by the camera, the image provider instance may process the received data based on the image parameter, to obtain image or video data that meets a requirement of the application.

FIG. 7a, FIG. 7b-1 and FIG. 7b-2, and FIG. 7c are examples of schematic diagrams of a process for sharing a camera by a plurality of applications according to an embodiment of this application. The process may include three phases, and in a time sequence, the three phases are as follows.

Phase 1: Device initialization phase. In this phase, an electronic device obtains camera information, for example, a quantity of cameras, an identifier of a camera, a location of a camera, and a data format (which includes a resolution, a frame rate, a color space, and the like) supported by a camera.

When the camera is a built-in camera of the electronic device, the foregoing process of obtaining the camera information may be completed in an initialization process of the electronic device. When the camera and the electronic device are separately disposed (that is, an apparatus in which the camera is disposed and an electronic device in which an application using the camera is located are different devices), the electronic device may interact with the apparatus in which the camera is disposed, to complete the foregoing process of obtaining the camera information.

Phase 2: Request phase. In this phase, an application in the electronic device sends an image obtaining request, to request to obtain an image/video collected by the camera. Based on the image obtaining request sent by the application, an image consumer instance and an image provider instance are created, and an association between the image consumer instance and the image provider instance is established, to establish a data transmission channel between the application and the camera.

Phase 3: Data transmission phase. In this phase, image/video data collected by the camera is transmitted to the application based on the data transmission channel established in Phase 2.

It should be noted that, after the camera information is obtained in the initialization phase, the obtained camera information is stored in the electronic device, and therefore the phase 1 does not need to be performed each time before an application sends an image obtaining request.

The following describes the foregoing three phases in detail with reference to FIG. 7a, FIG. 7b-1 and FIG. 7b-2, and FIG. 7c by using an example in which the camera is located outside the electronic device.

Figure 7A:
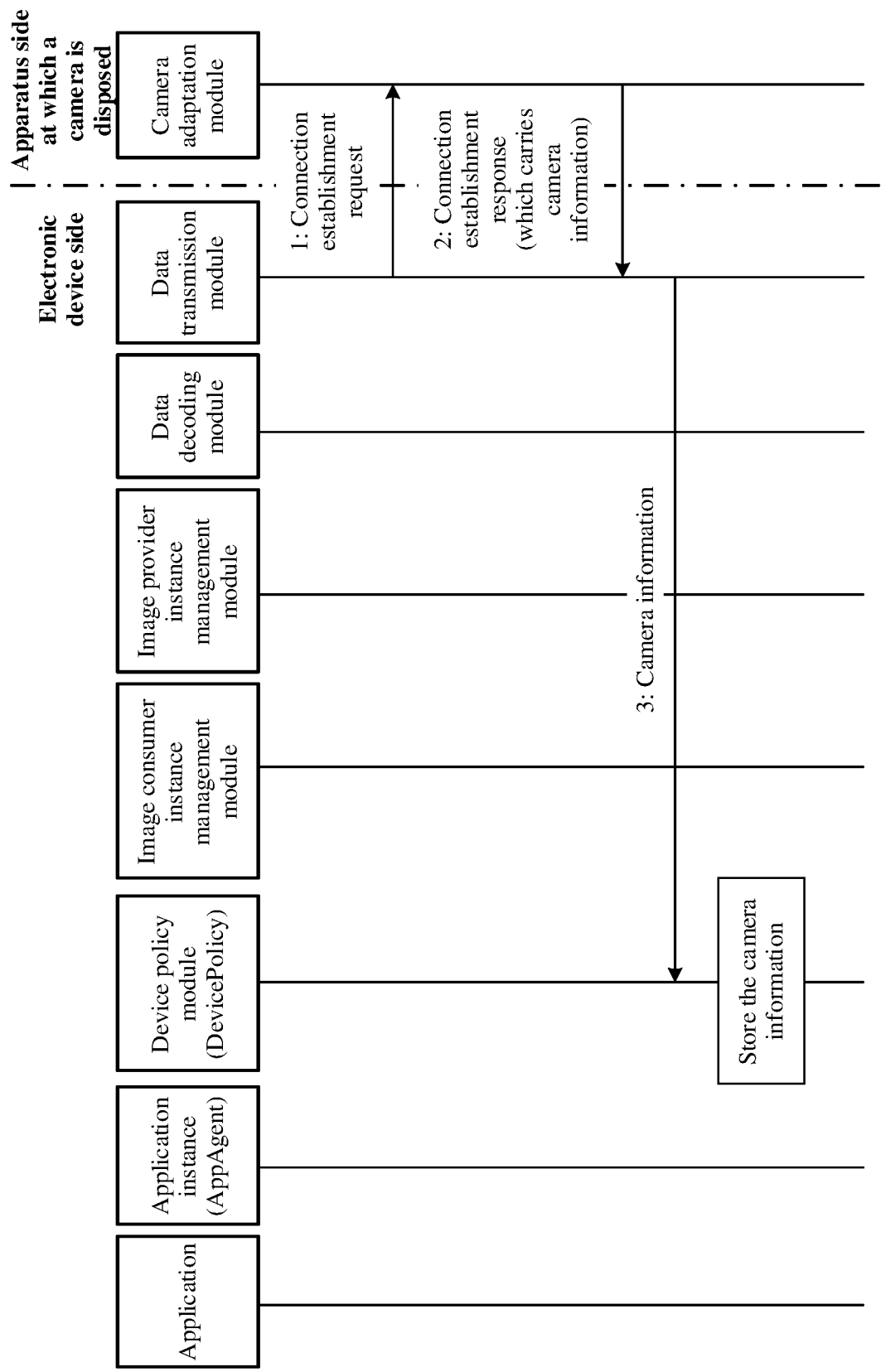
FIG. 7a is a schematic diagram of a first phase of a process for sharing a camera by a plurality of applications according to an embodiment of this application.

Phase 1: a device initialization phase. As shown in FIG. 7a, the phase may include the following steps.

Step 1: A data transmission module in the electronic device sends a connection establishment request to a target apparatus in which the camera is disposed, to request to establish a connection to the target apparatus, and request to obtain the camera information.

Step 2: In response to the request, a camera adaptation module at a target apparatus side establishes a connection to the electronic device, and returns a connection establishment response, where the connection establishment response carries the camera information, and the camera information includes a quantity of cameras, an identifier of a camera, a location of a camera, and a data format (for example, a resolution, a frame rate, and a color space) supported by a camera.

Step 3: A device policy module (DevicePolicy) in the electronic device stores the obtained camera information.

Figures 1, 7B:
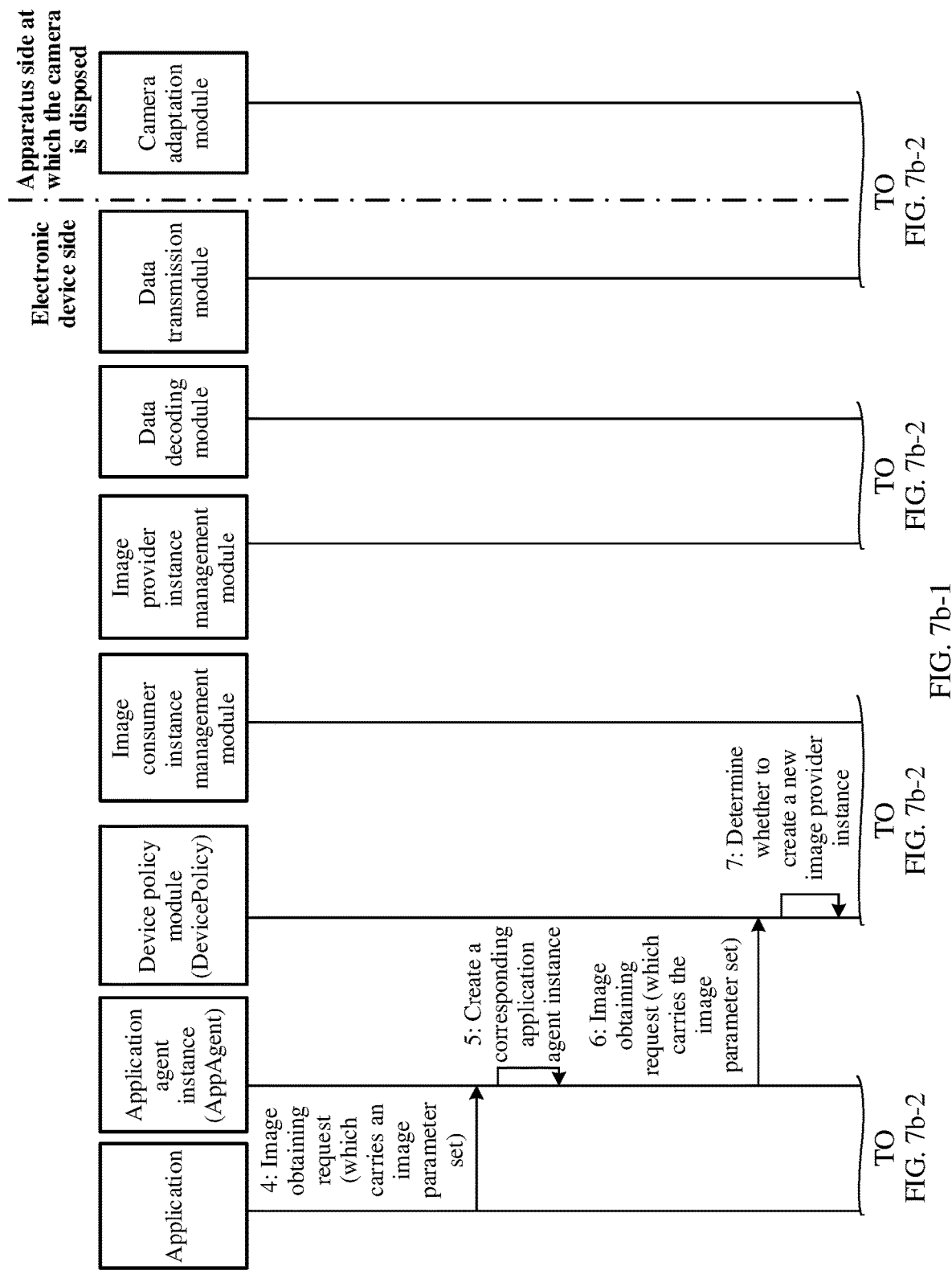
Figures 2, 7B:
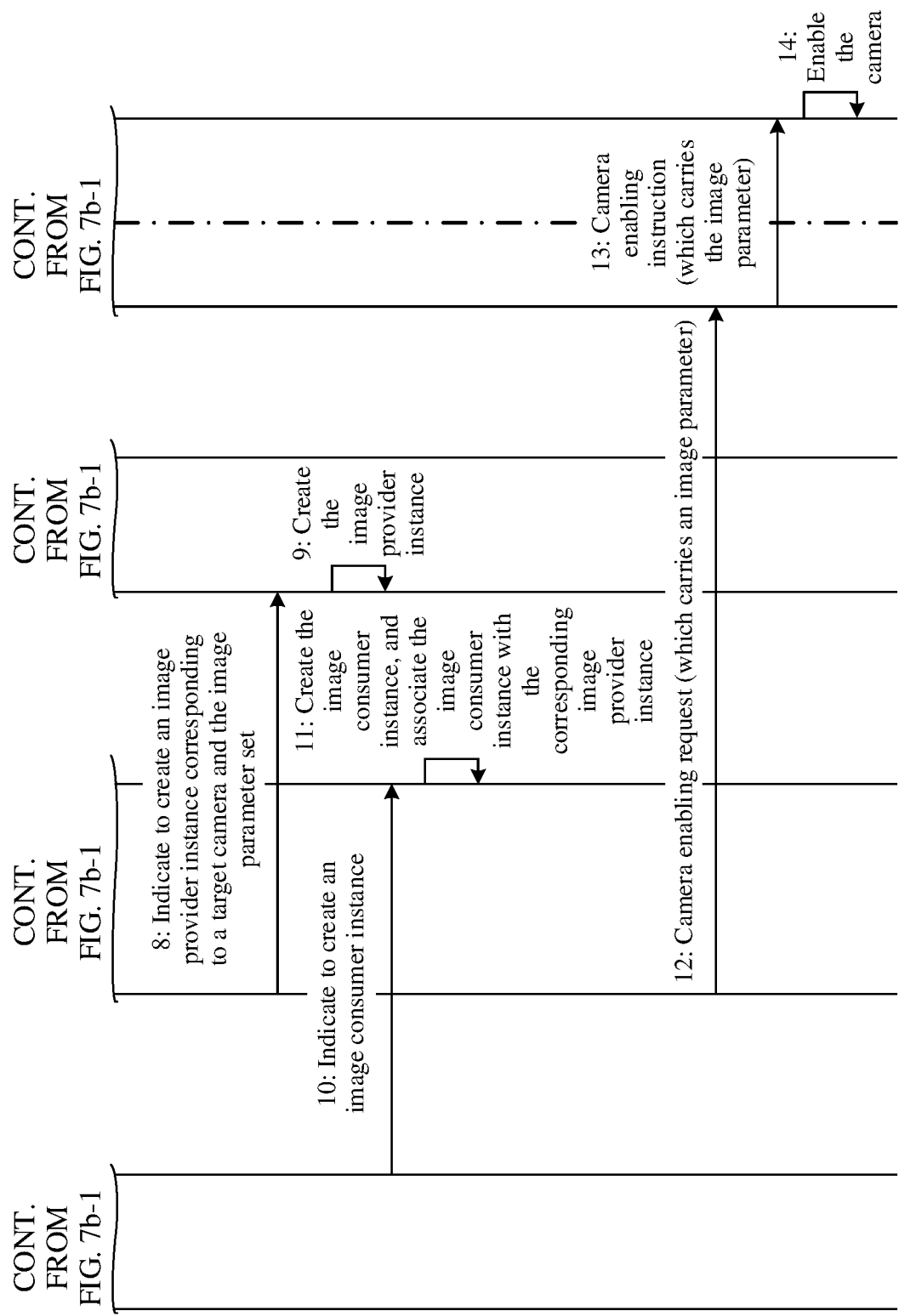

Phase 2: a request phase. As shown in FIG. 7b-1 and FIG. 7b-2, the phase may include the following steps.

Step 4: The application in the electronic device sends the image obtaining request, where the request may carry an identifier of a target apparatus (namely, an identifier of the apparatus in which the camera is disposed) and image format information.

The image format information is used to indicate an image format required by the application. The image format information may specifically include at least one of the following information: a resolution, a frame rate, a color space, a rotation angle, indication information indicating whether mirroring is performed, cropping policy information, and the like. In this embodiment of this application, the image format information may be represented as an image parameter set.

In this step, the application may autonomously determine, based on the camera information obtained in Phase 1, a target camera that needs to be used. Specifically, the application may select a camera that matches a location based on a service type of the application. For example, in a vehicle driving scenario, a fatigue driving detection application in a mobile phone needs to view a status of a driver. Therefore, a camera at a driving position (for example, a camera disposed on a dashboard) is selected as the target camera, and the identifier of the target apparatus and an identifier of the target camera are carried in the image obtaining request.

The application may also display a camera list in a user interface of the application (the camera list is generated based on the camera information obtained in Phase 1), and a user selects the target camera from the list. The camera list may include a location, a name, description information, and the like of a camera.

Step 5: Create an application agent instance (AppAgent) corresponding to the application.

An image data callback interface (the interface is used to receive image data required by the application), the identifier of the target camera, and an image parameter set of the application may be received by using the application agent instance.

Step 6: The application agent instance (AppAgent) sends an image obtaining request to the device policy module (DevicePolicy), where the image obtaining request carries the identifier of the target camera and the image parameter set, and the image parameter set is used to indicate the image format required by the application.

Step 7: The device policy module (DevicePolicy) determines whether to create a new image provider instance (ImageProvider), and if the new image provider instance needs to be created, sends an indication used to create the image provider instance.

In this step, the device policy module determines whether an image provider instance corresponding to the target camera and the image parameter set already exists. If the image provider instance does not exist, the image provider instance corresponding to the target camera and the image parameter set needs to be created. If the image provider instance exists, the new image provider instance does not need to be created, and a creation success response may be directly returned to the application agent instance, so that the application agent instance consumes data provided by the existing image provider instance.

This process is described by using an example in which the new image provider instance needs to be created.

Step 8: The device policy module (DevicePolicy) indicates to create the new image provider instance (ImageProvider instance).

Step 9: An image provider instance management module creates the image provider instance (ImageProvider) based on an indication of the device policy module, where the image provider instance corresponds to the target camera and the image parameter set.

Step 10: The application agent instance (AppAgent) indicates an image consumer instance management module to create an image consumer instance (ImageConsumer) corresponding to the application, to consume data that is in a specified format and that is generated by the image provider instance (ImageProvider).

Step 11: The image consumer instance management module creates the image consumer instance (ImageConsumer) based on an indication of the application agent instance, and establishes an association between the image consumer instance and the corresponding image provider instance (namely, the image provider instance created in Step 9).

One application agent instance (AppAgent) corresponds to one image consumer instance (ImageConsumer). The image consumer instance (ImageConsumer) can be associated with the corresponding image provider instance (ImageProvider) based on an image parameter required by the application. A plurality of ImageConsumers may be associated with a same ImageProvider.

Step 12: The device policy module (DevicePolicy) determines, based on the camera information of the target apparatus, with reference to all requests, and from image parameter sets of applications that obtain images/videos by using the target camera, image parameters (for example, a resolution, a frame rate, and a color space) that match the image parameter sets of these applications and that are of the target camera.

Step 13: The data transmission module sends a camera enabling instruction to a camera SDK module at the target apparatus side, where the camera enabling instruction carries the image parameter determined in Step 12.

The camera SDK module is disposed in the target apparatus, and is configured to receive a camera information obtaining request sent by an electronic device side and return the camera information to the electronic device (refer to Step 1 and Step 2 in FIG. 7a), further configured to receive a control request for the target camera to enable a corresponding camera, and further configured to return the image/video data collected by the camera to the electronic device.

Step 14: The camera SDK module at the target apparatus side sends an enabling instruction to the target camera based on the image parameter carried in the instruction, to instruct the target camera to collect image/video data based on the image parameter.

In this case, a data channel is established between the application and the camera, and the data channel may be represented as follows.

Application agent instance-image consumer instance-image provider instance-data transmission module-camera.

The foregoing process is described by using a process in which one application requests to obtain an image as an example. If a plurality of applications request to obtain an image, for an image obtaining request of each application, a data channel between a corresponding application and a target camera may be established according to the foregoing process. If a plurality of applications request a same target camera and require a same image parameter set, a plurality of image consumer instances corresponding to the plurality of applications may correspond to a same image provider instance, to meet image format requirements of the plurality of applications.

Figure 7C:
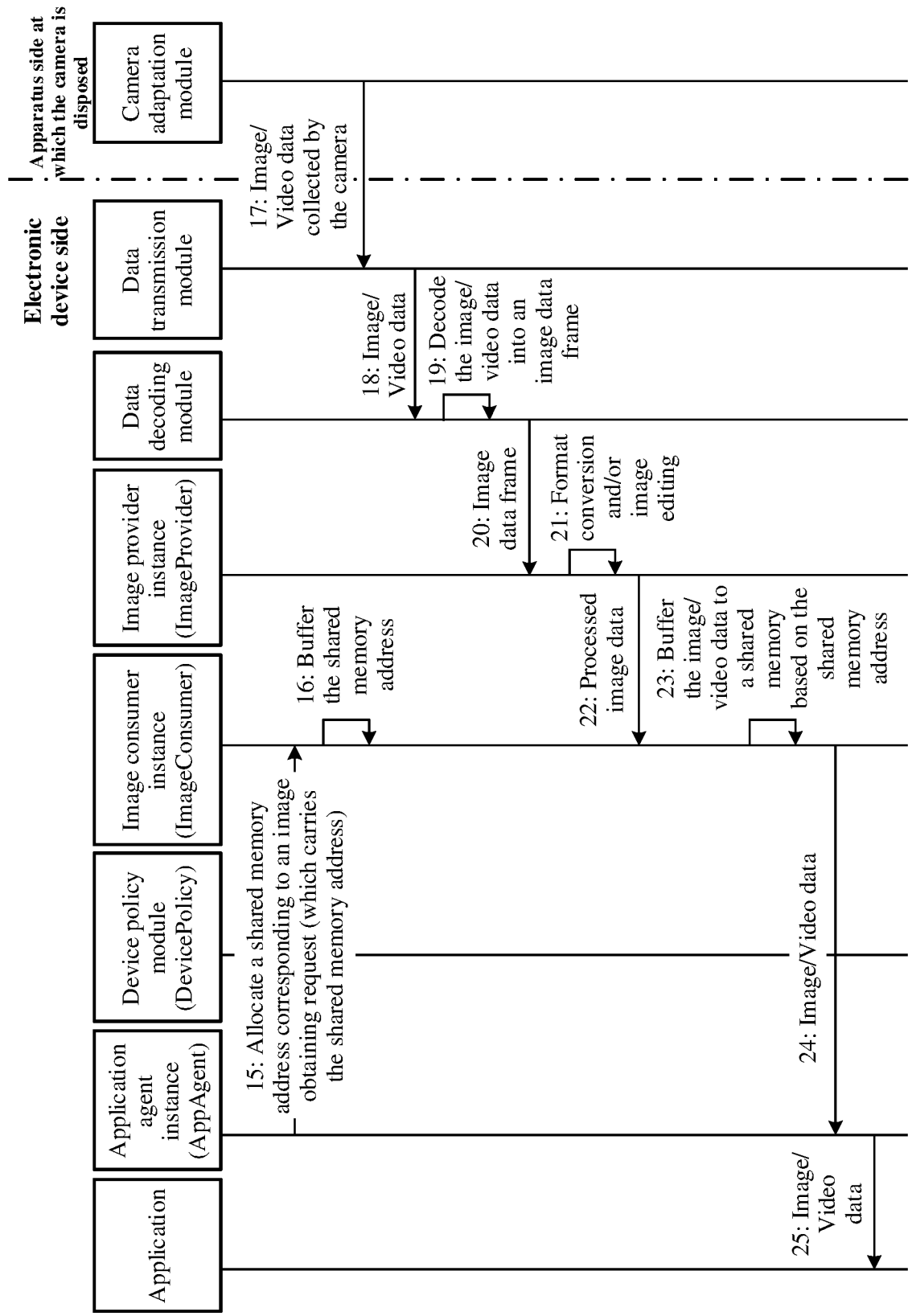
FIG. 7c is a schematic diagram of a third phase of a process for sharing a camera by a plurality of applications according to an embodiment of this application.

Phase 3: a data transmission phase. As shown in FIG. 7c, the phase may include the following steps.

Step 15: The application agent instance (AppAgent) requests several shared memory blocks for sharing data between modules. The application agent instance (AppAgent) sends a request to the image consumer instance (ImageConsumer), where the request carries a shared memory address.

Step 16: The image consumer instance (ImageConsumer) buffers the request sent by the application agent instance (AppAgent), and stores the shared memory address.

Step 17: The camera SDK module at the target apparatus side receives the image/video data collected by the camera, and sends the image/video data to the data transmission module.

Data transmitted by the camera SDK module is encoded and compressed to adapt to network transmission. A compression format may be H264, H265, or another image transmission encoding format that meets a requirement of network transmission.

Step 18: The data transmission module sends the received image/video data to a data decoding module.

Step 19: The data decoding module decodes the received image/video data into an image data frame, for example, an image data frame in a YUV or RGB format.

Step 20: The data decoding module sends the image data frame to the image provider instance (ImageProvider) corresponding to the target camera.

In this step, if there are a plurality of image provider instances corresponding to the target camera, the data decoding module separately sends the image data frame to the plurality of image provider instances.

Step 21: An image provider instance (ImageProvider) that receives the image data frame processes the received image data frame based on an image parameter set corresponding to the image provider instance, to obtain image/video data that meets a requirement of an application. For example, at least one of the following image processing operations may be performed based on an image parameter in the image parameter set: resolution conversion, color space conversion, frame rate control, image rotation, image mirroring, image cropping, and the like.

Step 22: The image provider instance (ImageProvider) sends processed image/video data to an associated image consumer instance (ImageConsumer).

In this step, if there are a plurality of image provider instances corresponding to the target camera, each of the plurality of image provider instances sends processed image/video data to an image consumer instance (ImageConsumer) associated with the image provider instance.

Step 23: After receiving the image/video data, the image consumer instance (ImageConsumer) stores the received image/video data in a corresponding shared memory block based on the shared memory address buffered in Step 16.

Step 24: The image consumer instance (ImageConsumer) sends the image/video data to the application agent instance (AppAgent), or indicates the image consumer instance to read the image/video data from the shared memory block.

Step 25: The application agent instance (AppAgent) obtains the image/video data, and sends the image/video data to a corresponding application.

After the image/video data is successfully returned to the application, the image consumer instance may clear the shared memory block, store new data in the shared memory block, and send a new notification to the application agent instance, so that the application agent instance obtains new image/video data from the shared memory block and sends the new image/video data to a corresponding application.

In the foregoing process, in Step 15 and Step 16, the ImageConsumer receives the image obtaining request sent by the AppAgent and allocates a shared memory address. In Step 23 to Step 25, the ImageConsumer obtains the image obtaining request sent by the AppAgent, fills in the image data, and returns the image data to the AppAgent. The AppAgent calls the image callback interface of the application to return the image data to the application. The image obtaining request between the AppAgent and the ImageConsumer carries the shared memory address, so that a limited shared memory may be used for cycle and cyclic use, to avoid a decrease in system efficiency caused by separately applying for memory for each image obtaining request.

It can be learned from one of the foregoing embodiments or a combination of more of the foregoing embodiments that one application corresponds to one image consumer instance (ImageConsumer), one camera and one image parameter set correspond to one image provider instance (ImageProvider), and one image provider instance corresponds to one or more image consumer instances (ImageConsumer). The foregoing "provider-consumer" mechanism may be used to share data of one camera with a plurality of applications for use. Therefore, by establishing respective data channels for a plurality of cameras, the electronic device can simultaneously control and obtain data collected by the plurality of cameras. In this way, the plurality of applications at the electronic device side simultaneously obtain image data collected by the plurality of cameras, so that the plurality of applications simultaneously use, at a same moment, image data that is obtained by the one or more cameras and that meets different image parameter requirements, to improve user experience.

This embodiment of this application may be applied to a plurality of operating systems, and may be used across operating system platforms. For example, in the application scenario shown in FIG. 4a, the mobile phone and a vehicle-mounted terminal separately use different operating system platforms. For example, both an operating system of the mobile phone and an operating system of the vehicle-mounted terminal are a Huawei HarmonyOS. For another example, the operating system of the mobile phone is an Android (Android) system, and the operating system of the vehicle-mounted terminal is the Huawei HarmonyOS.

According to one of the foregoing embodiments or a combination of more of the foregoing embodiments, FIG. 4a, FIG. 8a, and FIG. 8b-1 and FIG. 8b-2 show examples of application of this embodiment of this application in a vehicle driving scenario.

As shown in FIG. 4a, the fatigue driving detection application 411, the gesture recognition application 412, the video call application 413, and the parking space recognition application 414 are installed in the mobile phone 410. The camera A that can collect the image of the driver is disposed on the dashboard of the vehicle 510. The front-facing camera B that can collect the front-facing exterior image of the vehicle is disposed on the front of the vehicle. The camera C that can collect the rear-facing exterior image of the vehicle is disposed on the tail of the vehicle. The camera A, the camera B, and the camera C are all connected to the camera adaptation module 511 in the in-vehicle system, and the working states of the camera A, the camera B, and the camera C may be controlled by the camera adaptation module 511. The camera virtualization engine 415 and the data transmission module 416 are disposed in the mobile phone 410.

The data transmission module 416 may communicate with the in-vehicle system, for example, may send a request for a camera to the in-vehicle system, so that the in-vehicle system controls the camera. The data transmission module 416 may further receive, from the in-vehicle system, image or video data collected by the camera.

The fatigue driving detection application 411 sends an image obtaining request, to request to obtain image data collected by the camera A. An image parameter set carried in the image obtaining request is {480p, 30 fps, nv21}, that is, an image resolution required by the application is 1080p, a frame rate is 30 fps, and a color space is nv21.

The gesture recognition application 412 sends an image obtaining request, to request to obtain the image data collected by the camera A. An image parameter set carried in the image obtaining request is {480p, 30 fps, nv21}.

The video call application 413 sends an image obtaining request to request to obtain image data collected by the camera B. An image parameter set carried in the image obtaining request is {1080p, 30 fps, nv21}.

The parking space recognition application 414 sends an image obtaining request to request to obtain image data collected by the camera C. An image parameter set carried in the image obtaining request is {480p, 30 fps, nv21}.

Figure 8A:
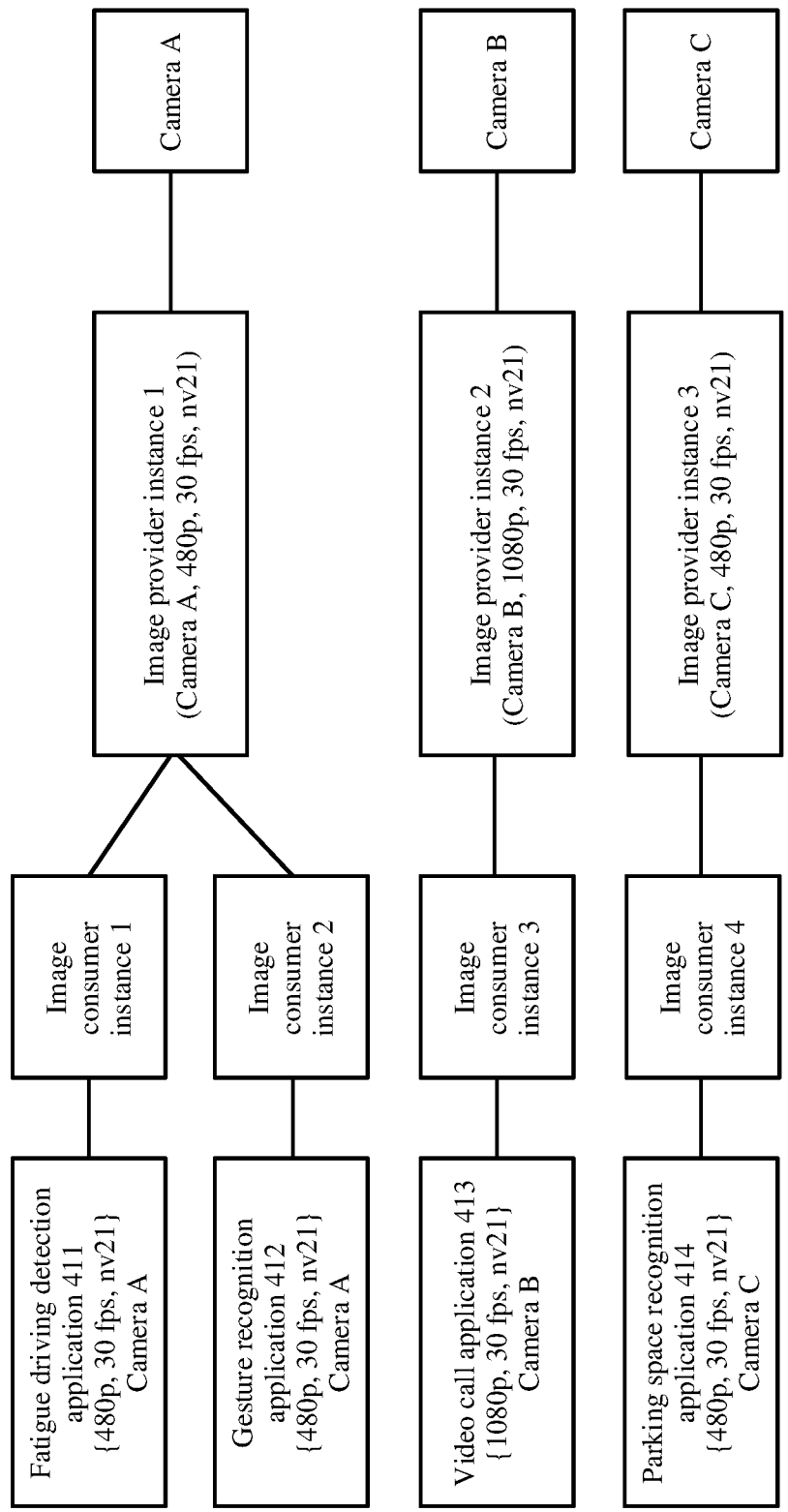

The camera virtualization engine 415 in the mobile phone 410 may create, based on the image obtaining requests of the foregoing applications, image consumer instances and image provider instances that are shown in FIG. 8a, and correspondences between the image consumer instances and the image provider instances and applications and cameras.

After receiving the data collected by the camera A, the data transmission module 416 in the mobile phone transmits the data to an image provider instance 1. The image provider instance 1 processes the received data into a data format required by the fatigue driving detection application 411 and the gesture recognition application 412, and separately sends processed data to an image consumer instance 1 and an image consumer instance 2. The image consumer instance 1 and the image consumer instance 2 respectively send the data to the fatigue driving detection application 411 and the gesture recognition application 412.

After receiving the data collected by the camera B, the data transmission module 416 in the mobile phone transmits the data to an image provider instance 2. The image provider instance 2 processes the received data into a data format required by the video call application 413, and sends processed data to an image consumer instance 3. The image consumer instance 3 sends the data to the video call application 413.

After receiving the data collected by the camera C, the data transmission module 416 in the mobile phone transmits the data to an image provider instance 3. The image provider instance 3 processes the received data into a data format required by the parking space recognition application 414, and sends processed data to an image consumer instance 4. The image consumer instance 4 sends the data to the parking space recognition application 414.

In this way, the fatigue driving detection application 411, the gesture recognition application 412, the video call application 413, and the parking space recognition application 414 share the camera A, the camera B, and the camera C at the same time.

Figures 1, 8B:
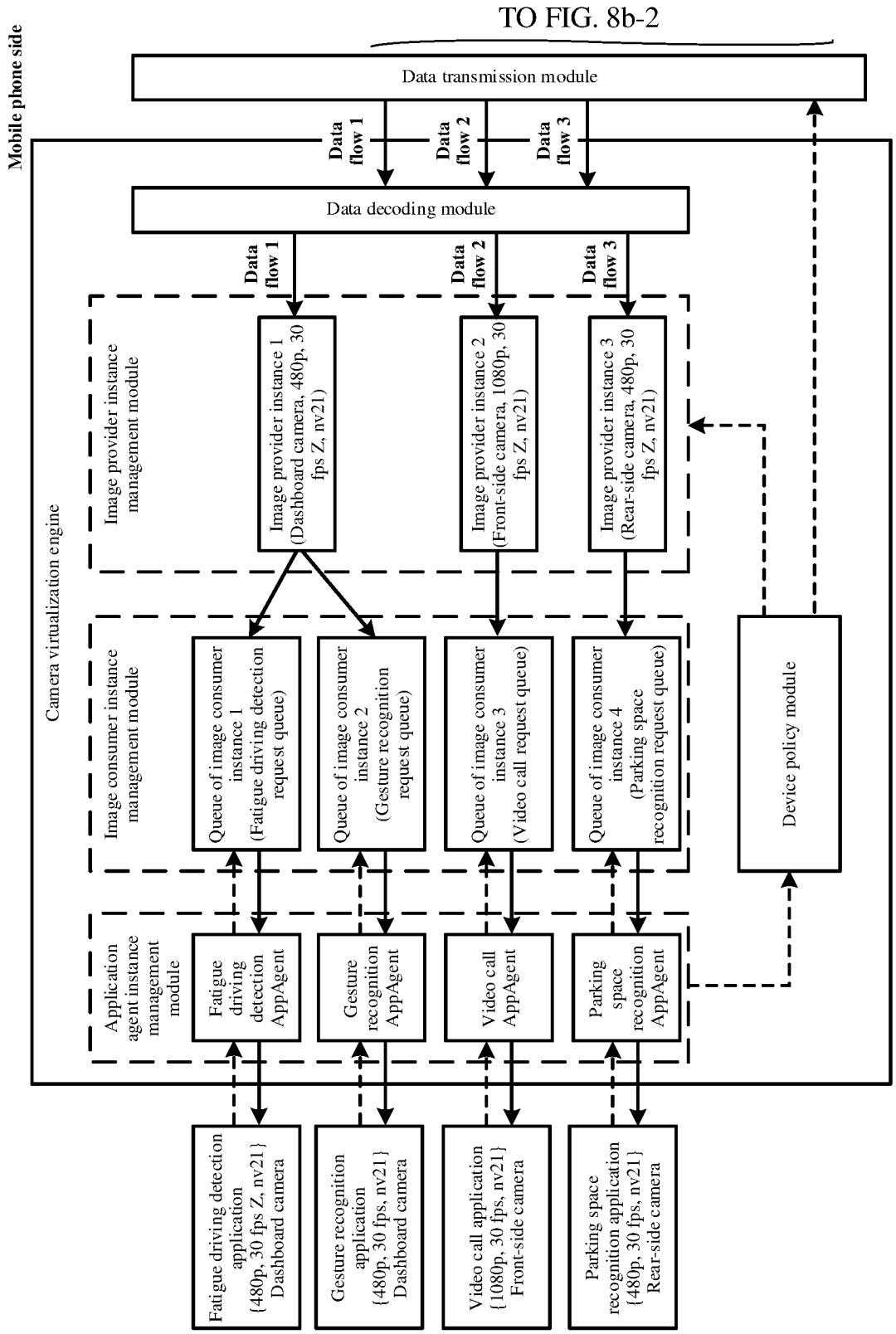
Figures 1, 2, 8B:
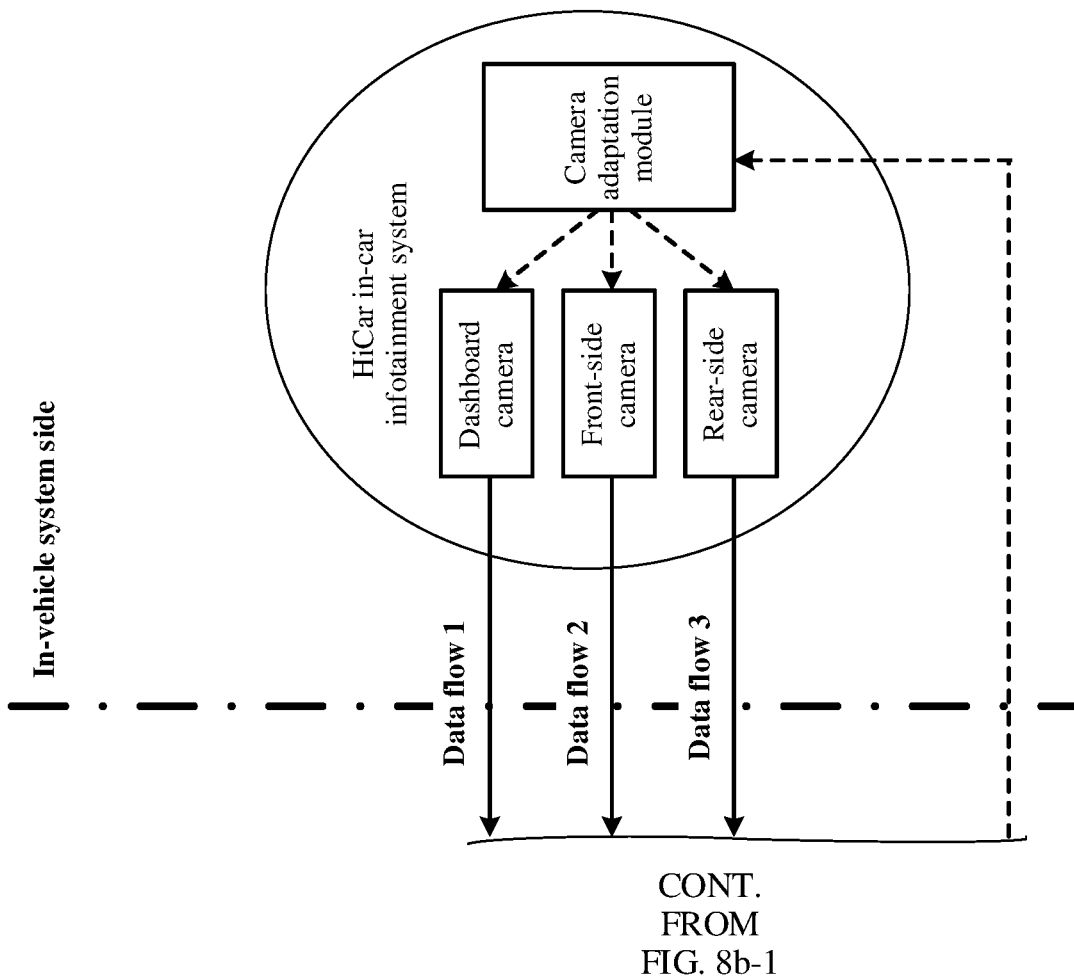

Based on the foregoing vehicle driving scenario, FIG. 8b-1 and FIG. 8b-2 show an example in which the in-vehicle system is a Huawei HiCar in-car infotainment system, and describes a process in which a plurality of applications in a mobile phone share a plurality of cameras disposed in a vehicle. A dashed line represents signaling transmission, and a solid line represents data transmission.

A fatigue driving detection application sends an image obtaining request to request to obtain image data collected by a dashboard camera (namely, a camera disposed on a dashboard). An image parameter set carried in the image obtaining request is {480p, 30 fps, nv21}. An application agent instance management module in a camera virtualization engine creates a fatigue driving detection application agent instance (AppAgent) corresponding to the application.

The fatigue driving detection AppAgent sends an image obtaining request to a device policy module (DevicePolicy). The device policy module (DevicePolicy) sends an instruction for creating an image provider instance to an image provider instance management module. The image provider instance management module creates, based on the instruction, an image provider instance 1 corresponding to the dashboard camera and the image parameter set {480p, 30 fps, nv21}. The fatigue driving detection AppAgent further indicates an image consumer instance management module to create an image consumer instance (ImageConsumer) 1 corresponding to the application. The image consumer instance management module creates the image consumer instance 1 based on an indication of the application agent instance, and establishes an association between the image consumer instance 1 and the image provider instance 1.

The device policy module (DevicePolicy) determines, with reference to all current image obtaining requests in which a target camera is the dashboard camera and from image parameter sets of applications that obtain an image/a video by using the dashboard camera, an image parameter that matches the image parameter sets of these applications and that is of the target camera, and sends the image parameter to a camera adaptation module in the HiCar in-car infotainment system by using a data transmission module, to control the dashboard camera.

After a gesture recognition application, a video call application, and a parking space recognition application at a mobile phone side send an image obtaining request, a processing process is similar, and details are not described again. The foregoing process can form a first data channel from the dashboard camera to the fatigue driving detection application and the gesture recognition application, a second data channel from a front-side camera of the vehicle to the video call application, and a third data channel from a rear-side camera of the vehicle to the parking space recognition application.

After the data transmission module at the mobile phone side receives a data flow 1 collected by the dashboard camera, the data flow 1 is stored in a fatigue driving detection request queue of the image consumer instance 1 and a gesture recognition request queue of an image consumer instance 2 along the first data channel by using a data decoding module, the image provider instance 1, and the image consumer instance 1 and the image consumer instance 2 that are associated with the image provider instance 1. Therefore, the fatigue driving detection AppAgent obtains image data from the fatigue driving detection request queue and sends the image data to the corresponding fatigue driving detection application, and a gesture recognition AppAgent obtains image data from the gesture recognition request queue and sends the image data to the corresponding gesture recognition application.

After the data transmission module at the mobile phone side receives a data flow 2 collected by the front-side camera of the vehicle, the data flow 2 is stored in a video call request queue of an image consumer instance 3 along the second data channel by using the data decoding module, an image provider instance 2, and the image consumer instance 3 associated with the image provider instance 2. Therefore, a video call AppAgent obtains image data from the video call request queue and sends the image data to the corresponding video call application.

After the data transmission module at the mobile phone side receives a data flow 3 collected by the rear-side camera of the vehicle, the data flow 3 is stored in a parking space recognition request queue of an image consumer instance 4 along the third data channel by using the data decoding module, an image provider instance 4, and the image consumer instance 4 associated with the image provider instance 4. Therefore, a parking space recognition AppAgent obtains image data from the parking space recognition request queue and sends the image data to the corresponding parking space recognition application.

Figure 9:
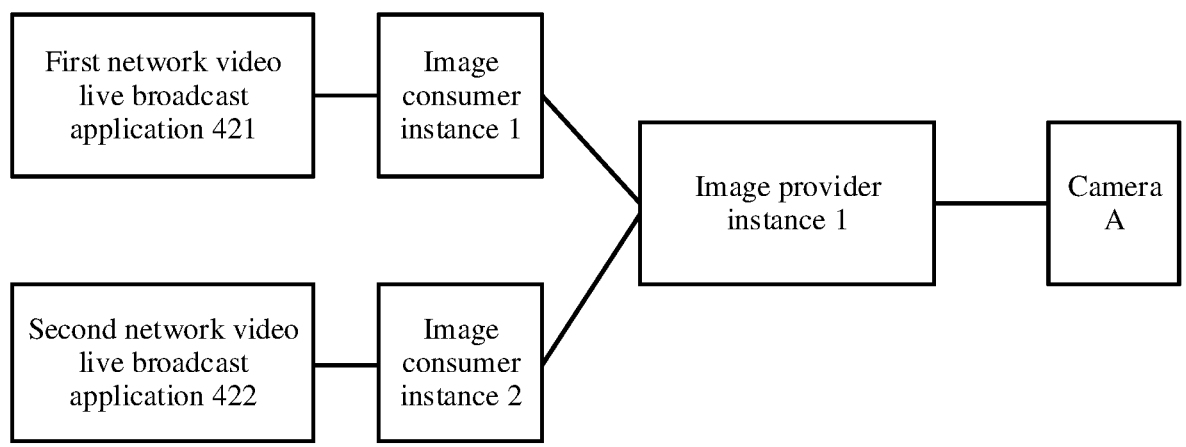
FIG. 9 is a schematic diagram of a relationship between an application, an image consumer instance, an image provider instance, and a camera in a network video live broadcasting scenario according to an embodiment of this application.
Figure 10:
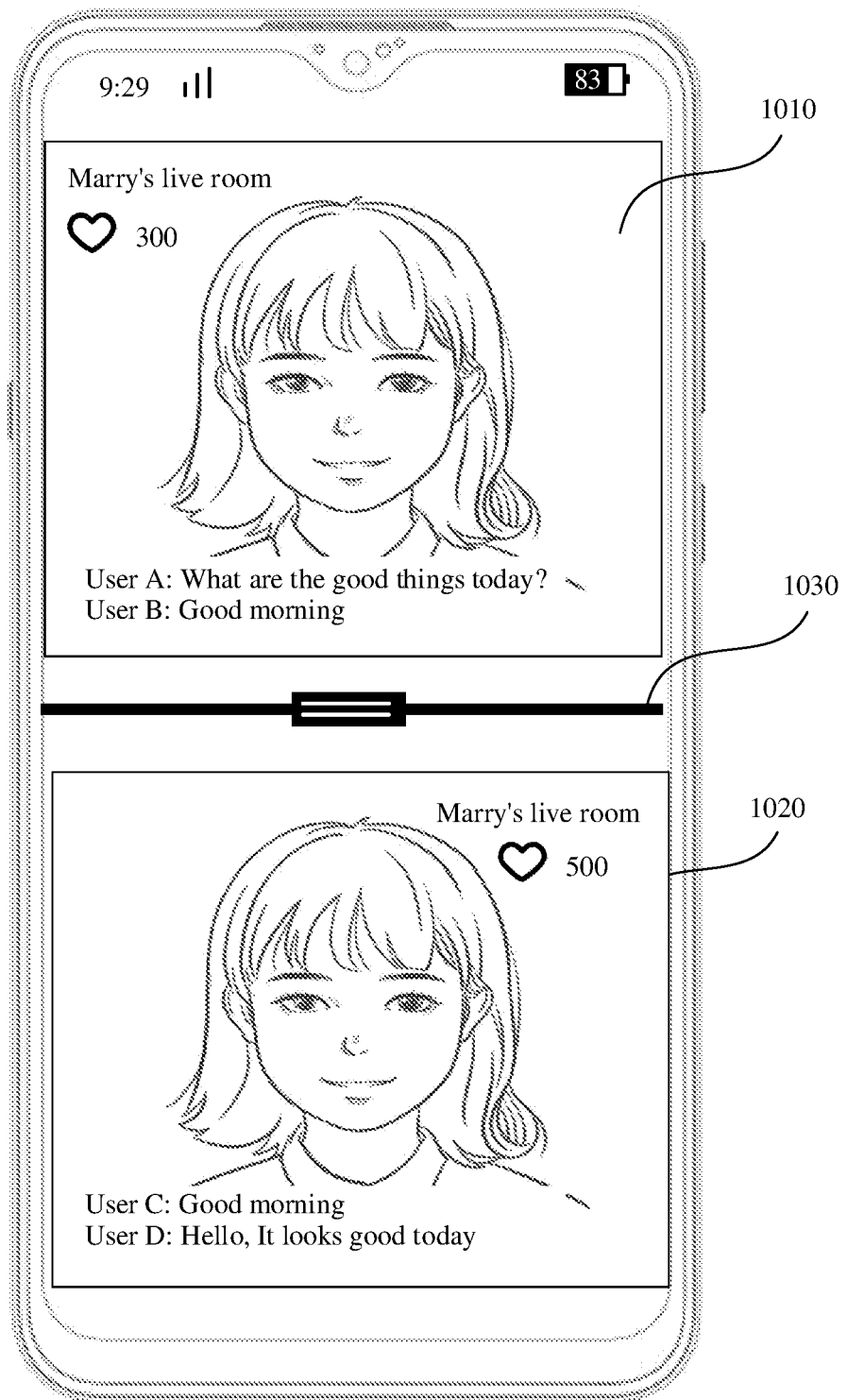
FIG. 10 is a schematic diagram of a network video live broadcasting interface according to an embodiment of this application.

According to one of the foregoing embodiments or a combination of more of the foregoing embodiments, FIG. 4b, FIG. 9, and FIG. 10 show examples of application of this embodiment of this application in a network video live broadcasting scenario.

As shown in FIG. 4b, the first network video live broadcast application 421 and the second network video live broadcast application 422 are installed in the mobile phone 420, and the camera virtualization engine 423 and the data transmission module 424 are disposed. The front-facing camera A and the two rear-facing cameras (for example, the camera B and the camera C) are disposed in the mobile phone 420 in a built-in manner. It should be understood that a plurality of front-facing cameras and a plurality of rear-facing cameras may also be disposed in the mobile phone 420 in a built-in manner. The camera virtualization engine 423 and the data transmission module 424 are disposed in the mobile phone 420.

Currently, a user needs to simultaneously start the first network video live broadcast application 421 and the second network video live broadcast application 422 in the mobile phone to perform network video live broadcasting. First, a screen splitting operation may be performed on the mobile phone, so that a screen of the mobile phone displays two windows, the first network video live broadcast application is started in a first split-screen window, and the second network video live broadcast application is started in a second split-screen window.

When the user starts live broadcasting in the first network video live broadcast application in the first split-screen window, the first network video live broadcast application 421 sends an image obtaining request to request to obtain image data collected by a built-in camera A. When the user starts live broadcasting in the second network video live broadcast application in the second split-screen window, the second network video live broadcast application 422 sends an image obtaining request to request to obtain image data collected by the built-in camera A. An image parameter required by the first network video live broadcast application 421 is the same as an image parameter required by the second network video live broadcast application 422.

The camera virtualization engine 423 in the mobile phone 420 may create, based on the image obtaining requests of the foregoing applications, image consumer instances and an image provider instance that are shown in FIG. 9, and a correspondence between the image consumer instances and the image provider instance and applications and a camera.

After receiving the data collected by the camera A, the data transmission module 424 in the mobile phone transmits the data to an image provider instance 1. The image provider instance 1 processes the received data into a data format that is required by the first network video live broadcast application 421 and the second network video live broadcast application 422, and separately sends processed data to an image consumer instance 1 and an image consumer instance 2. The image consumer instance 1 and the image consumer instance 2 respectively send the data to the first network video live broadcast application 421 and the second network video live broadcast application 422. In this way, the first network video live broadcast application 421 and the second network video live broadcast application 422 share the built-in camera A of the mobile phone at the same time. A user interface may be shown in FIG. 10.

As shown in FIG. 10, a user interface of the first network video live broadcast application 421 is displayed in a first split-screen window 1010, a user interface of the second network video live broadcast application 422 is displayed in a first split-screen window 1020, and a split bar 1030 is set between the first split-screen window 1010 and the second split-screen window 1020. Because the first network video live broadcast application and the second network video live broadcast application share the same front-facing camera, the two live broadcast applications display images at a same angle, to improve user experience. In addition, one mobile phone is used to simultaneously start a plurality of network live broadcast, to facilitate user operations and reduce costs.

The terms used in the foregoing embodiments are merely intended to describe specific embodiments, but are not intended to limit this application. The terms "one", "a", "the", "the foregoing", "the", and "this" of singular forms used in this specification and the appended claims of this application are also intended to include expressions such as "one or more", unless otherwise specified in the context clearly. It should be further understood that, in embodiments of this application, "one or more" refers to one, two, or more, and "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between associated objects.

Reference to "an embodiment", "some embodiments", or the like in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

In the foregoing embodiments of this application, the method provided in embodiments of this application is described from the perspective in which the mobile device (for example, the mobile phone) is used as an execution body. To implement functions in the method provided in embodiments of this application, a terminal device may include a hardware structure and/or a software module, to implement the foregoing functions in a form of the hardware structure, the software module, or a combination of the hardware structure and the software module. Whether a function in the foregoing functions is implemented by using the hardware structure, the software module, or the combination of the hardware structure and the software module depends on particular applications and design constraints of the technical solutions.

According to the context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It should be noted that a part of this patent application document includes copyright protected content. The copyright owner reserves the copyright except copies are made for the patent documents or the recorded content of the patent documents in the Patent Office.

What is claimed is:

1. A method for sharing a camera by a plurality of applications, the method comprising:

separately performing, by an electronic device, in response to an image obtaining request sent by a first application and an image obtaining request sent by a second application, wherein the image obtaining requests are used to request to obtain, from a first camera, image data that meets a requirement of a first image parameter set, the following operations:
creating a first image consumer instance corresponding to the first application and creating a second image consumer instance corresponding to the second application;
obtaining a corresponding first image provider instance based on the first camera and the first image parameter set that are requested by the image obtaining requests sent by the first application and the second application;
establishing an association between the first image consumer instance and the first image provider instance and an association between the second image consumer instance and the first image provider instance; and
in response to receiving the image data from the first camera:
processing, by the first image provider instance based on the first image parameter set, the received image data being collected by the first camera and sending processed image data to the first image consumer instance and the second image consumer instance that are associated with the first image provider instance;
sending, by the first image consumer instance, the received image data to the first application, and sending, by the second image consumer instance, the received image data to the second application; and
performing, in response to an image obtaining request sent by a third application, wherein the image obtaining request is used to request to obtain, from the first camera, image data that meets a requirement of a second image parameter set, the following operation:
creating a third image consumer instance corresponding to the third application;
obtaining a corresponding second image provider instance based on the first camera and the second image parameter set that are requested by the image obtaining request sent by the third application;
establishing an association between the third image consumer instance and the second image provider instance; and
performing, in response to receiving image data from the first camera, the following operation:
processing, by the second image provider instance based on the second image parameter set, the received image data being collected by the first camera and sending processed image data to the third image consumer instance associated with the second image provider instance; and
sending, by the third image consumer instance, the received image data to the third application.

2. The method according to claim 1, further comprising sending a control instruction to the first camera, wherein the control instruction carries an image parameter that is used to control the first camera to collect the image data, and wherein the image parameter matches an image parameter supported by the first camera, is an image parameter that is in the first image parameter set and the second image parameter set and that meets a maximization requirement.

3. The method according to claim 2,
wherein the first camera is a built-in camera of the electronic device,
wherein the first camera is a camera of a communication apparatus connected to the electronic device,
wherein a second camera is a built-in camera of the electronic device, or
wherein the second camera is a camera of a communication apparatus connected to the electronic device.

4. The method according to claim 1, further comprising:
performing, in response to an image obtaining request sent by a fourth application, wherein the image obtaining request is used to request to obtain, from a second camera, image data that meets a third image parameter set the following operations:
creating a fourth image consumer instance corresponding to the fourth application;
obtaining a corresponding third image provider instance based on the second camera and the third image parameter set that are requested by the image obtaining request sent by the fourth application, wherein the third image parameter set is the same as or different from the first image parameter set;
establishing an association between the fourth image consumer instance and the third image provider instance; and
performing, in response to receiving image data from the second camera, the following operations:
processing, by the third image provider instance based on the third image parameter set, the received image data being collected by the second camera, and sending processed image data to the fourth image consumer instance associated with the third image provider instance; and
sending, by the fourth image consumer instance, the received image data to the fourth application.

5. The method according to claim 1, wherein the image data collected by the first camera is separately sent to all image provider instances corresponding to the first camera.

6. The method according to claim 1, wherein processing, by the first image provider instance based on the first image parameter set, the received image data collected by the first camera comprises at least one of the following operations:
performing, based on an image format parameter in the first image parameter set, format conversion on the image data received from the first camera;
performing, based on a color space parameter in the first image parameter set, color space conversion on the image data received from the first camera;
performing, based on an image resolution in the first image parameter set, image resolution conversion on the image data received from the first camera;
performing, based on a video frame rate in the first image parameter set, video frame rate conversion on the image data received from the first camera; or
performing, based on image editing operation indication information in the first image parameter set, image editing on the image data received from the first camera, wherein the image editing operation indication information comprises at least one of rotation indication information, mirroring indication information, and cropping indication information.

7. The method according to claim 1,
wherein the first camera is a built-in camera of the electronic device,
wherein the first camera is a camera of a communication apparatus connected to the electronic device, wherein a second camera is a built-in camera of the electronic device, or wherein the second camera is a camera of a communication apparatus connected to the electronic device.

8. A method for sharing a camera by a plurality of applications, the method comprising:
performing, by an electronic device, in response to an image obtaining request sent by a first application, wherein the image obtaining request is used to request to obtain, from a first camera, image data that meets a requirement of a first image parameter set, the following operations:
creating a first image consumer instance corresponding to the first application;
obtaining a corresponding first image provider instance based on the first camera and the first image parameter set that are requested by the image obtaining request sent by the first application; and
establishing an association between the first image consumer instance and the first image provider instance;
performing, in response to an image obtaining request sent by a second application, wherein the image obtaining request is used to request to obtain, from a second camera, image data that meets a requirement of a second image parameter set, and wherein the second image parameter set is the same as or different from the first image parameter set, the following operations:
creating a second image consumer instance corresponding to the second application;
obtaining a corresponding second image provider instance based on the second camera and the second image parameter set that are requested by the image obtaining request sent by the second application;
establishing an association between the second image consumer instance and the second image provider instance; and
performing, in response to receiving image data from the first camera and the second camera, the following operations:
processing, by the first image provider instance based on the first image parameter set, the received image data collected by the first camera, sending processed image data to the first image consumer instance associated with the first image provider instance, and sending, by the first image consumer instance, the received image data to the first application; and
processing, by the second image provider instance based on the second image parameter set, the received image data being collected by the second camera, sending processed image data to the second image consumer instance associated with the second image provider instance, and sending, by the second image consumer instance, the received image data to the second application;
performing, in response to an image obtaining request sent by a third application, wherein the image obtaining request is used to request to obtain, from the first camera, image data that meets a requirement of a third image parameter set, and the third image parameter set is different from the first image parameter set, the following operations:

creating a third image consumer instance corresponding to the third application;
obtaining a corresponding third image provider instance based on the first camera and the third image parameter set that are requested by the image obtaining request sent by the third application;
establishing an association between the third image consumer instance and the third image provider instance; and
performing, in response to receiving image data from the first camera, the following operations:
processing, by the third image provider instance based on the third image parameter set, the received image data being collected by the first camera, and sending processed image data to the third image consumer instance associated with the third image provider instance; and
sending, by the third image consumer instance, the received image data to the third application.

9. The method according to claim 8, further comprising sending a control instruction to the first camera, wherein the control instruction carries an image parameter that is used to control the first camera to collect the image data, wherein the image parameter matches an image parameter supported by the first camera, is an image parameter that is in the first image parameter set and the third image parameter set and meets a maximization requirement.

10. The method according to claim 9,
wherein the first camera is a built-in camera of the electronic device and the second camera is another built-in camera of the electronic device,
wherein the first camera is a built-in camera of the electronic device and the second camera is a camera of a communication apparatus connected to the electronic device,
wherein the first camera is a camera of a communication apparatus connected to the electronic device and the second camera is a built-in camera of the electronic device, or
wherein the first camera is a camera of a communication apparatus connected to the electronic device and the second camera is a camera of another communication apparatus connected to the electronic device.

11. The method according to claim 8, wherein the image data being collected by the first camera is separately sent to all image provider instances corresponding to the first camera.

12. The method according to claim 8, wherein processing, by the first image provider instance based on the first image parameter set, the received image data collected by the first camera comprises at least one of the following:
performing, based on an image format parameter in the first image parameter set, format conversion on the image data received from the first camera;
performing, based on a color space parameter in the first image parameter set, color space conversion on the image data received from the first camera;
performing, based on an image resolution in the first image parameter set, image resolution conversion on the image data received from the first camera;
performing, based on a video frame rate in the first image parameter set, video frame rate conversion on the image data received from the first camera; or
performing, based on image editing operation indication information in the first image parameter set, image editing on the image data received from the first camera, wherein the image editing operation indication information comprises at least one of rotation indication information, mirroring indication information, and cropping indication information.

13. The method according to claim 8,
wherein the first camera is a built-in camera of the electronic device and the second camera is another built-in camera of the electronic device,
wherein the first camera is a built-in camera of the electronic device and the second camera is a camera of a communication apparatus connected to the electronic device,
wherein the first camera is a camera of a communication apparatus connected to the electronic device and the second camera is a built-in camera of the electronic device, or
wherein the first camera is a camera of a communication apparatus connected to the electronic device and the second camera is a camera of another communication apparatus connected to the electronic device.

14. An electronic device comprising:
at least one memory; and
at least one processor configured to execute a computer program stored in the at least one memory, the computer program including instructions for:
  separately performing, in response to an image obtaining request sent by a first application and an image obtaining request sent by a second application, wherein the image obtaining request is used to request to obtain, from a first camera, image data that meets a requirement of a first image parameter set, the following operations:
    creating a first image consumer instance corresponding to the first application and creating a second image consumer instance corresponding to the second application;
    obtaining a corresponding first image provider instance based on the first camera and the first image parameter set that are requested by the image obtaining requests sent by the first application and the second application;
    establishing an association between the first image consumer instance and the first image provider instance and an association between the second image consumer instance and the first image provider instance; and
    performing, in response to receiving image data from the first camera, the following operations:
      processing, by the first image provider instance based on the first image parameter set, the received image data collected by the first camera and sending processed image data to the first image consumer instance and the second image consumer instance that are associated with the first image provider instance; and
      sending, by the first image consumer instance, the received image data to the first application, and sending, by the second image consumer instance, the received image data to the second application;
  performing, in response to an image obtaining request sent by a third application, wherein the image obtaining request is used to request to obtain, from the first camera, image data that meets a requirement of a second image parameter set, the following operations:
    creating a third image consumer instance corresponding to the third application;
    obtaining a corresponding second image provider instance based on the first camera and the second image parameter set that are requested by the image obtaining request sent by the third application;
    establishing an association between the third image consumer instance and the second image provider instance; and
    performing, in response to receiving image data from the first camera, the following operations:
      processing, by the second image provider instance based on the second image parameter set, the received image data being collected by the first camera, and sending processed image data to the third image consumer instance associated with the second image provider instance; and
      sending, by the third image consumer instance, the received image data to the third application.

15. The electronic device according to claim 14, wherein the instructions further comprise sending a control instruction to the first camera, wherein the control instruction carries an image parameter that is used to control the first camera to collect image data, and wherein the image parameter matches an image parameter supported by the first camera, is an image parameter that is in the first image parameter set and the second image parameter set and meets a maximization requirement.

16. The electronic device according to claim 15,
wherein the first camera is a built-in camera of the electronic device,
wherein the first camera is a camera of a communication apparatus connected to the electronic device,
wherein a second camera is a built-in camera of the electronic device, or
wherein the second camera is a camera of a communication apparatus connected to the electronic device.

17. The electronic device according to claim 14, wherein the instructions further comprise performing, in response to an image obtaining request sent by a fourth application, wherein the image obtaining request is used to request to obtain, from a second camera, image data that meets a third image parameter set, the following operations:
  creating a fourth image consumer instance corresponding to the fourth application;
  obtaining a corresponding third image provider instance based on the second camera and the third image parameter set that are requested by the image obtaining request sent by the fourth application, wherein the third image parameter set is the same as or different from the first image parameter set;
  establishing an association between the fourth image consumer instance and the third image provider instance; and
  performing, in response to receiving image data from the second camera, the following operations:
    processing, by the third image provider instance based on the third image parameter set, the received image data collected by the second camera and sending processed image data to the fourth image consumer instance associated with the third image provider instance; and
    sending, by the fourth image consumer instance, the received image data to the fourth application.

18. The electronic device according to claim 14, wherein the image data collected by the first camera is separately sent to all image provider instances corresponding to the first camera.

19. The electronic device according to claim 14, wherein processing, by the first image provider instance based on the first image parameter set, the received image data collected by the first camera comprises at least one of the following:
- performing, based on an image format parameter in the first image parameter set, format conversion on the image data received from the first camera;
- performing, based on a color space parameter in the first image parameter set, color space conversion on the image data received from the first camera;
- performing, based on an image resolution in the first image parameter set, image resolution conversion on the image data received from the first camera;
- performing, based on a video frame rate in the first image parameter set, video frame rate conversion on the image data received from the first camera; or
- performing, based on image editing operation indication information in the first image parameter set, image editing on the image data received from the first camera, wherein the image editing operation indication information comprises at least one of rotation indication information, mirroring indication information, and cropping indication information.

20. The electronic device according to claim 14,
- wherein the first camera is a built-in camera of the electronic device,
- wherein the first camera is a camera of a communication apparatus connected to the electronic device,
- wherein a second camera is a built-in camera of the electronic device, or
- wherein the second camera is a camera of a communication apparatus connected to the electronic device.

* * * * *